Nov. 7, 1950 — L. R. BRADFORD ET AL — 2,529,072

BUTTONHOLE SEWING MACHINE

Filed May 21, 1948 — 21 Sheets-Sheet 1

INVENTORS
LEONARD R. BRADFORD
WILLIAM W. DUNNELL, JR.
FRANCIS J. McAVINNEY

BY Dike, Calver & Porter

Nov. 7, 1950 L. R. BRADFORD ET AL 2,529,072
BUTTONHOLE SEWING MACHINE
Filed May 21, 1948 21 Sheets-Sheet 2
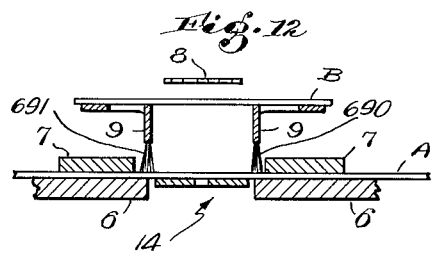
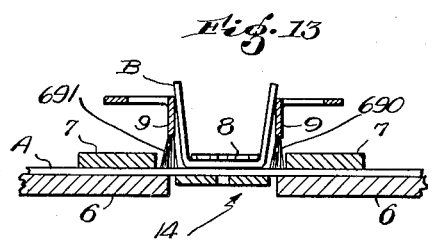
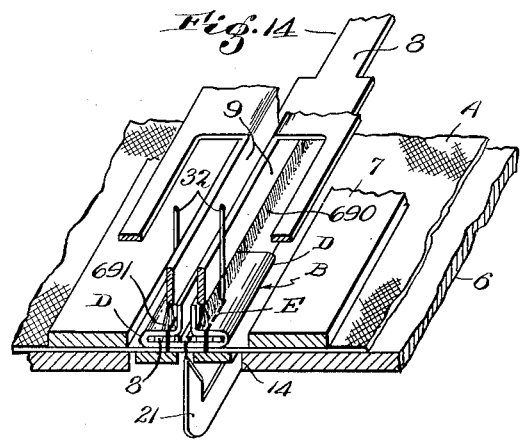
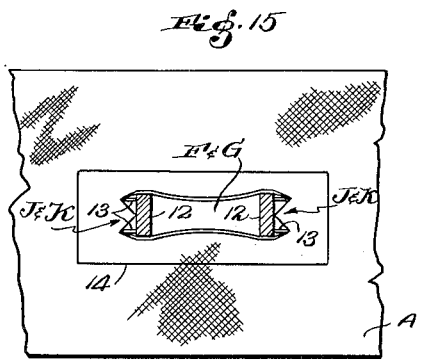
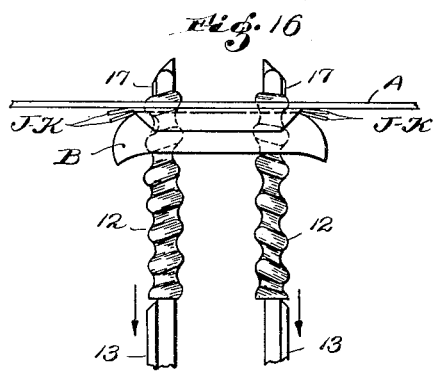
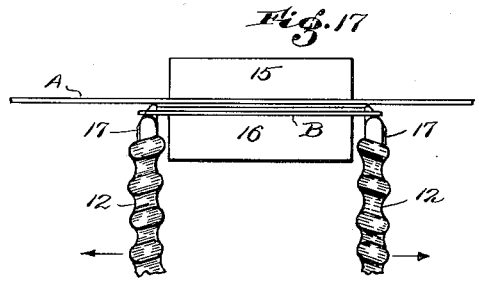
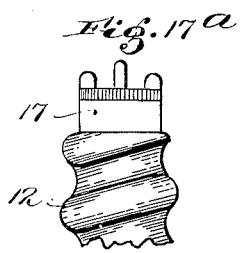
*INVENTORS*
*LEONARD R. BRADFORD*
*WILLIAM W. DUNNELL, JR.*
*FRANCIS J. McAVNNEY*
BY Dike, Calver + Porter Attys.

Nov. 7, 1950     L. R. BRADFORD ET AL     2,529,072
BUTTONHOLE SEWING MACHINE
Filed May 21, 1948     21 Sheets-Sheet 3
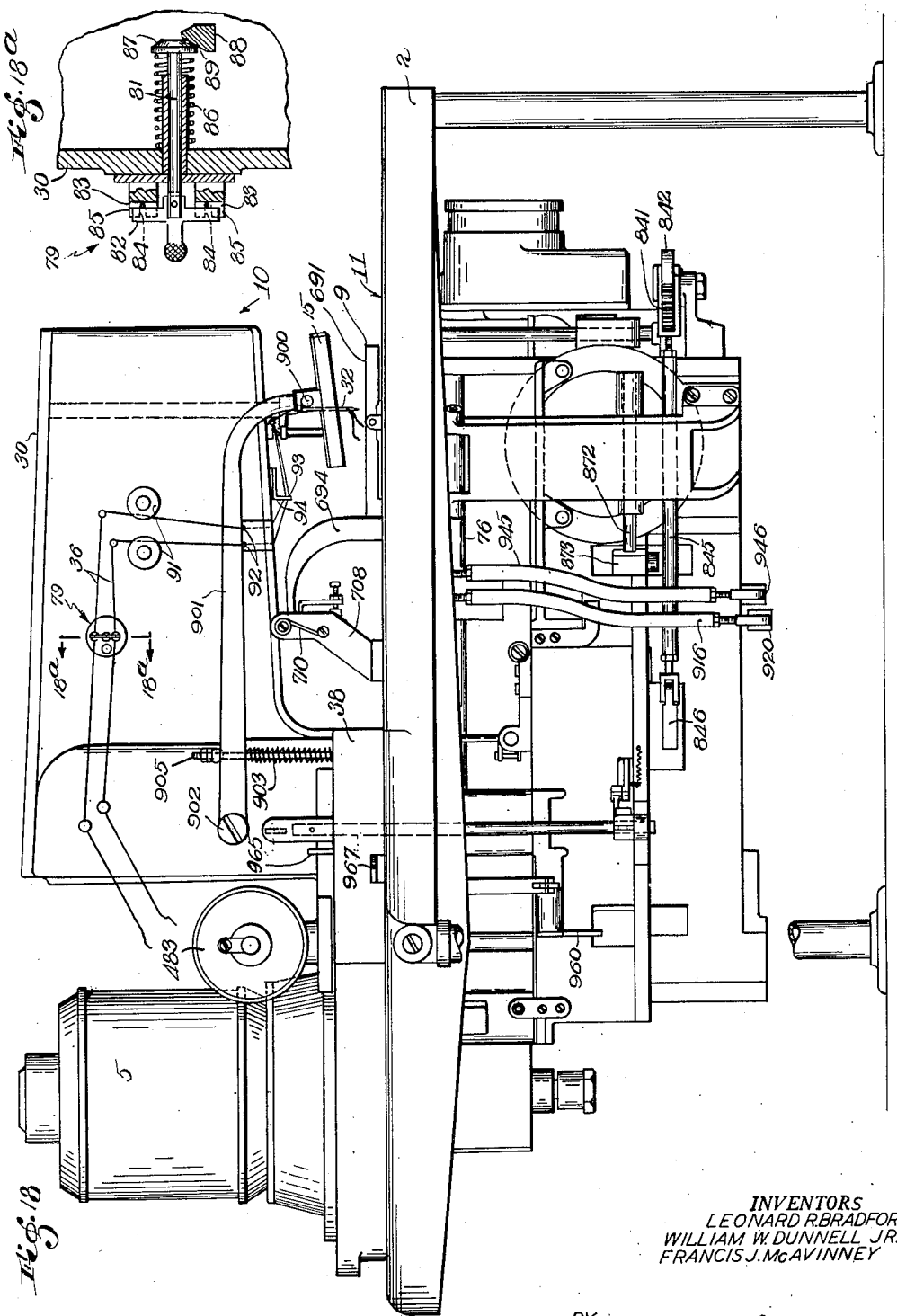
INVENTORS
LEONARD R. BRADFORD
WILLIAM W. DUNNELL JR.
FRANCIS J. McAVINNEY
BY Dike, Calver + Porter Attys Nov. 7, 1950 L. R. BRADFORD ET AL 2,529,072
BUTTONHOLE SEWING MACHINE
Filed May 21, 1948 21 Sheets-Sheet 4
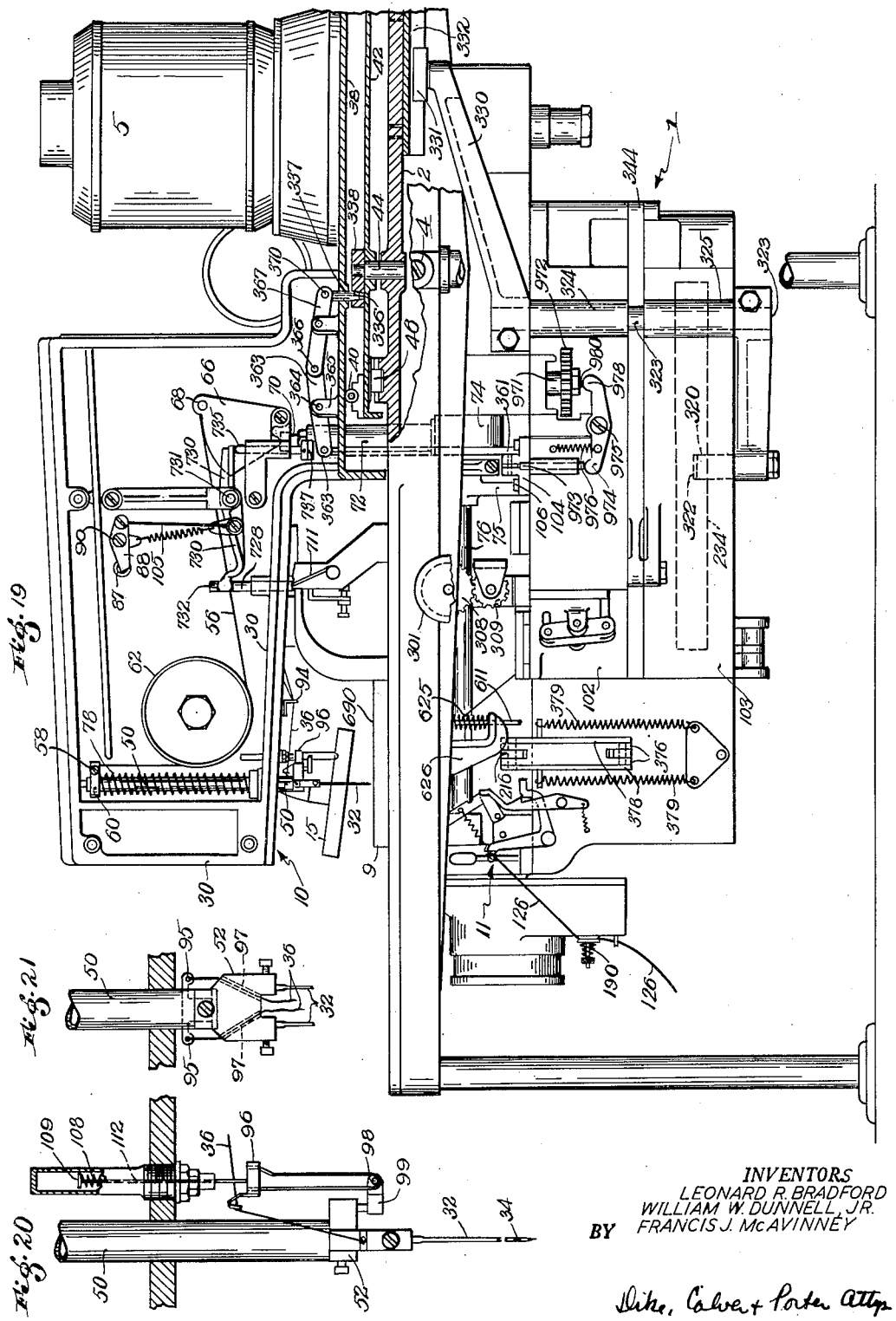
INVENTORS
LEONARD R. BRADFORD
WILLIAM W. DUNNELL, JR.
FRANCIS J. McAVINNEY
BY
Dike, Calver + Porter attys

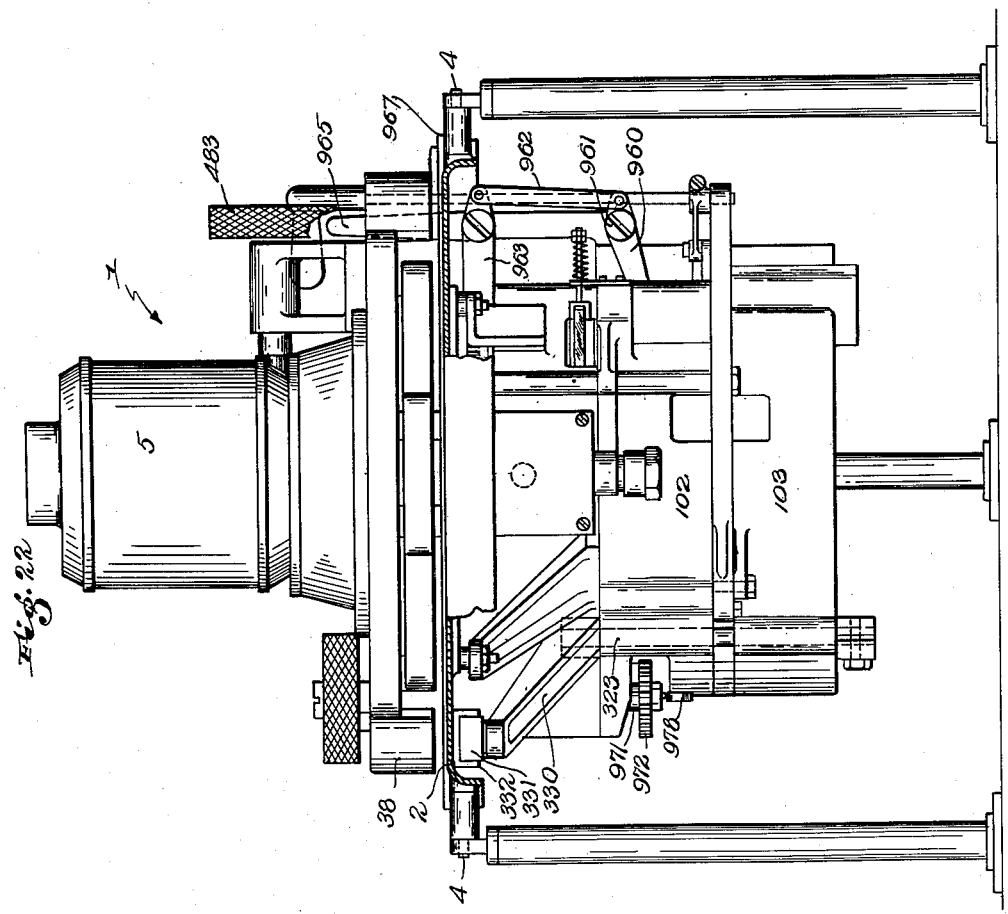

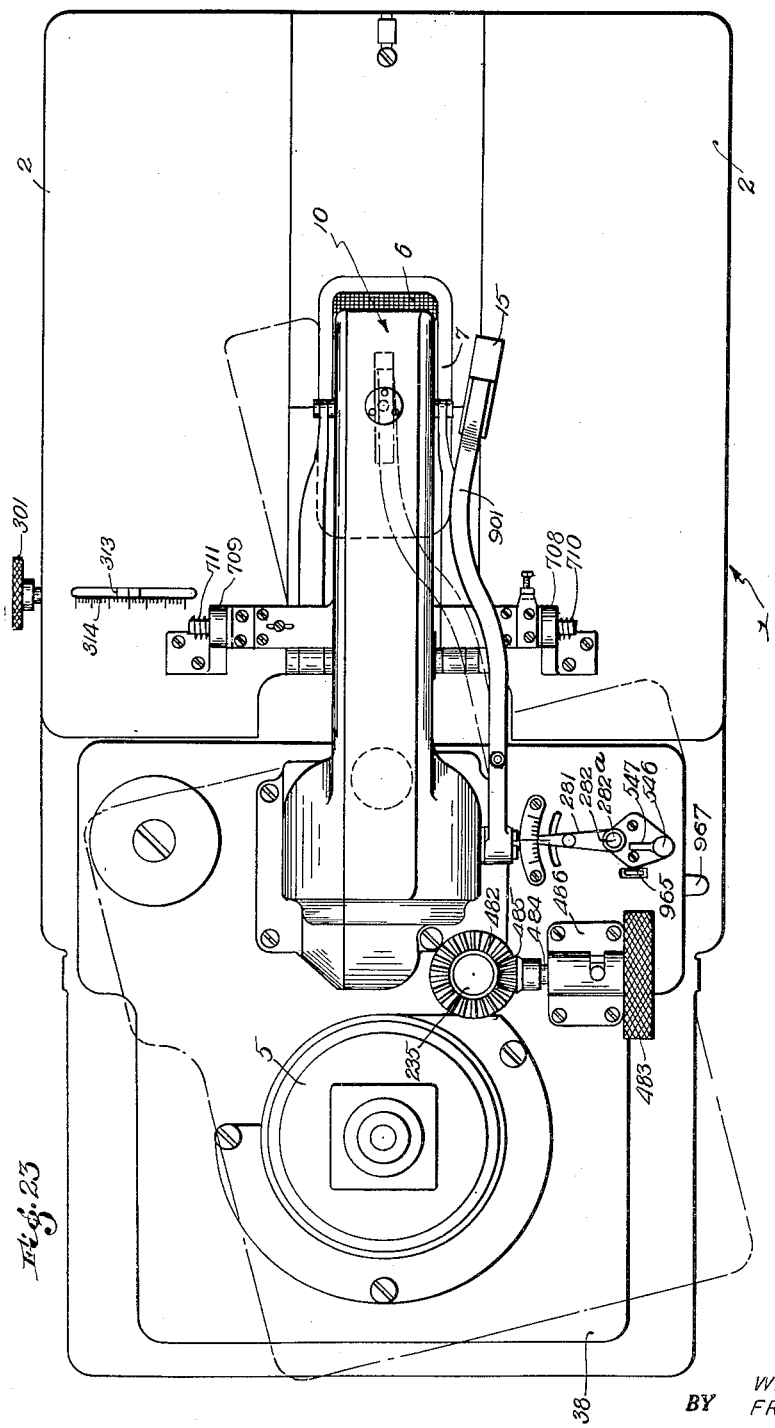

Nov. 7, 1950     L. R. BRADFORD ET AL     2,529,072
BUTTONHOLE SEWING MACHINE
Filed May 21, 1948     21 Sheets-Sheet 7
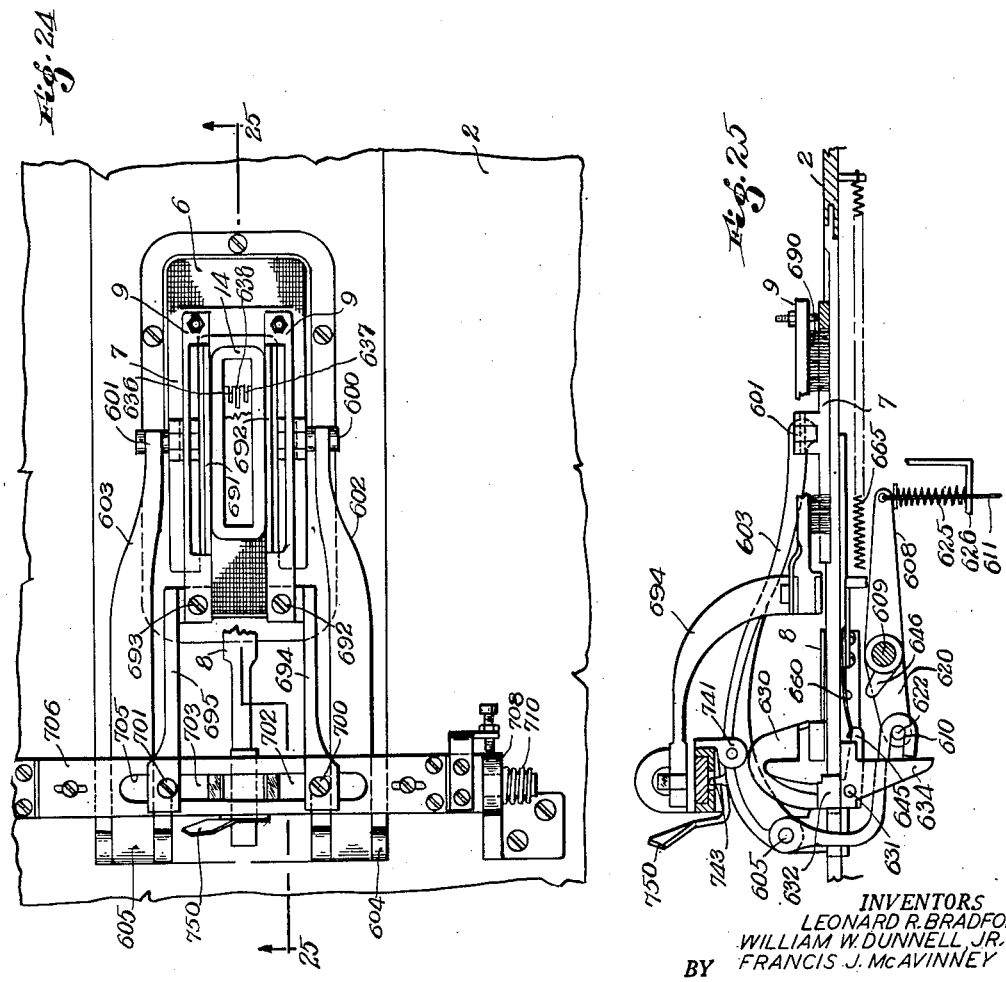
INVENTORS
LEONARD R. BRADFORD
WILLIAM W. DUNNELL, JR.
BY FRANCIS J. McAVINNEY
Dike, Calver + Porter attys

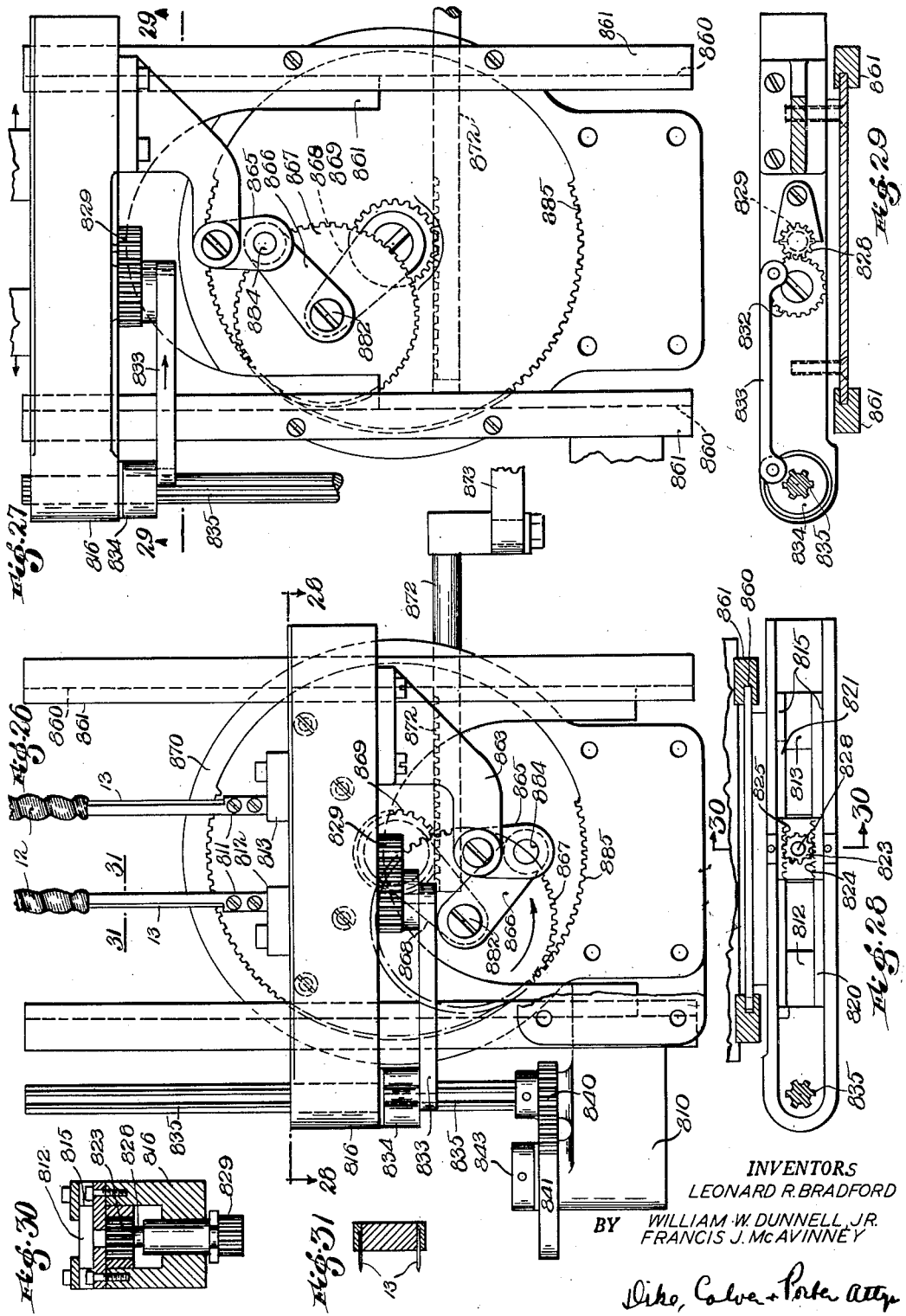

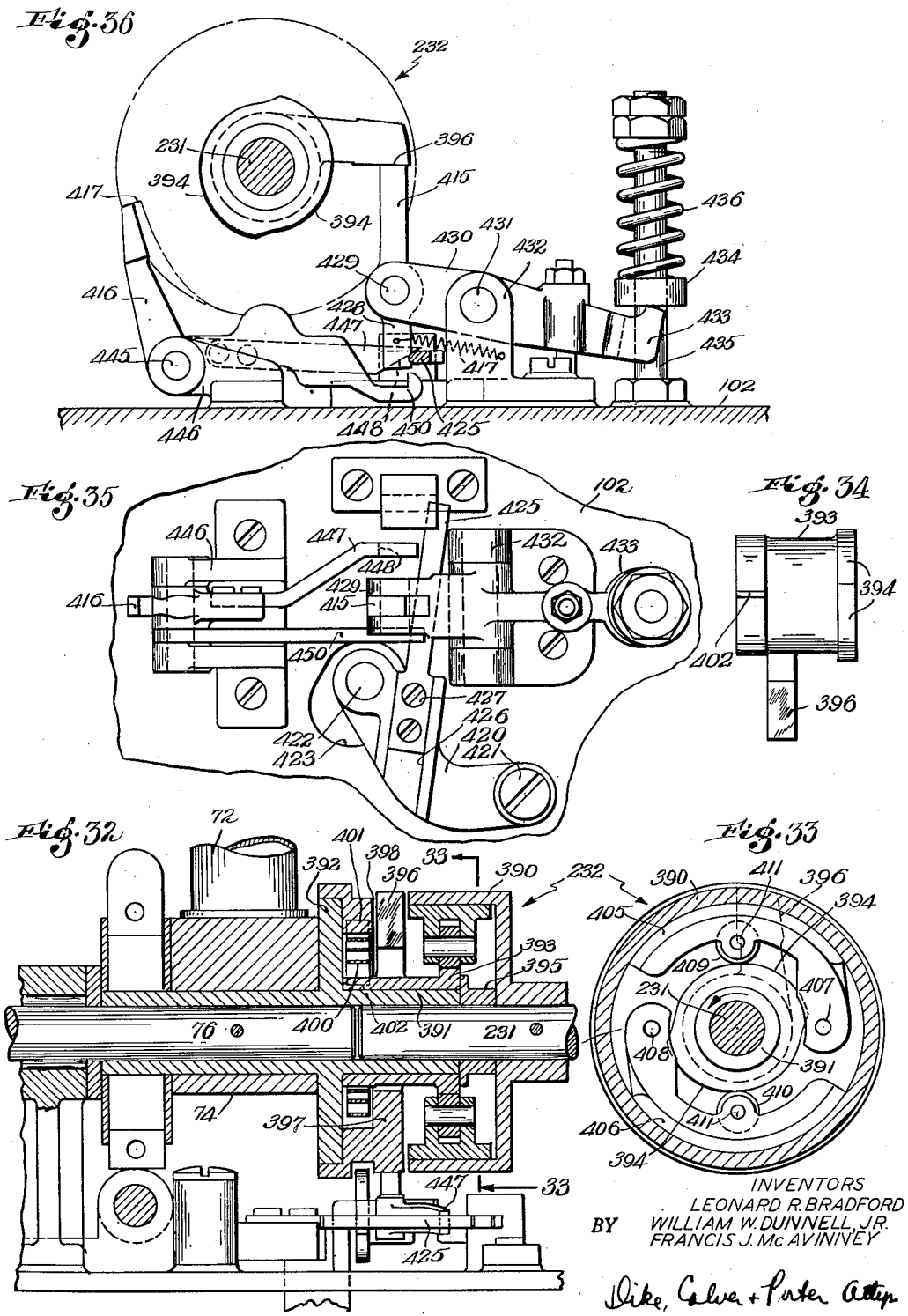

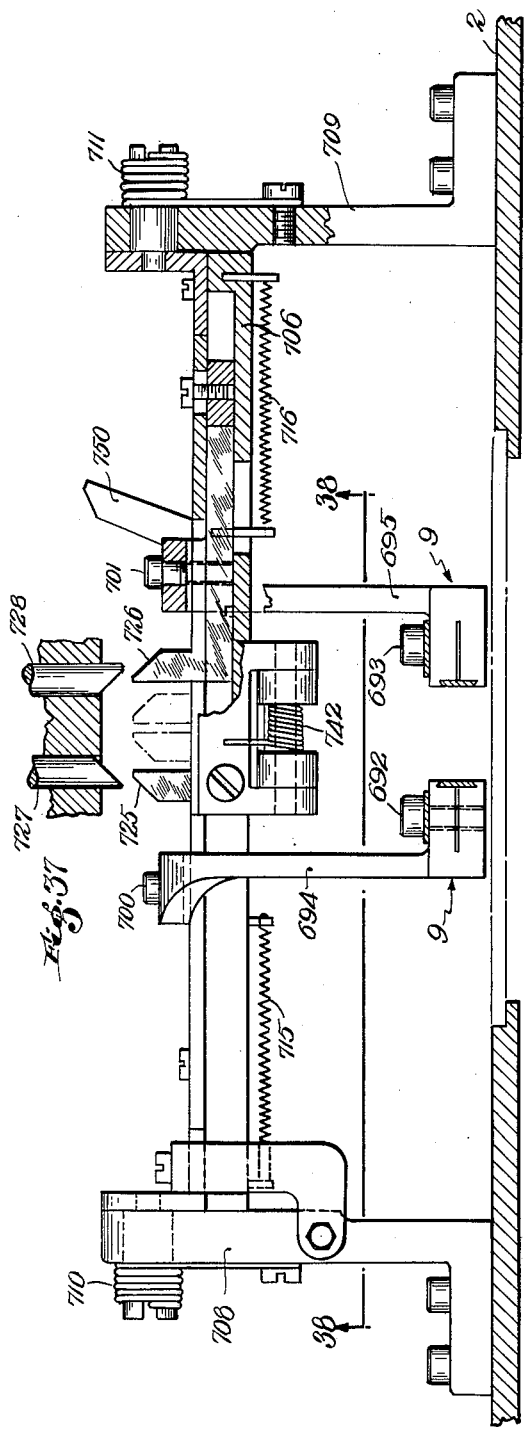
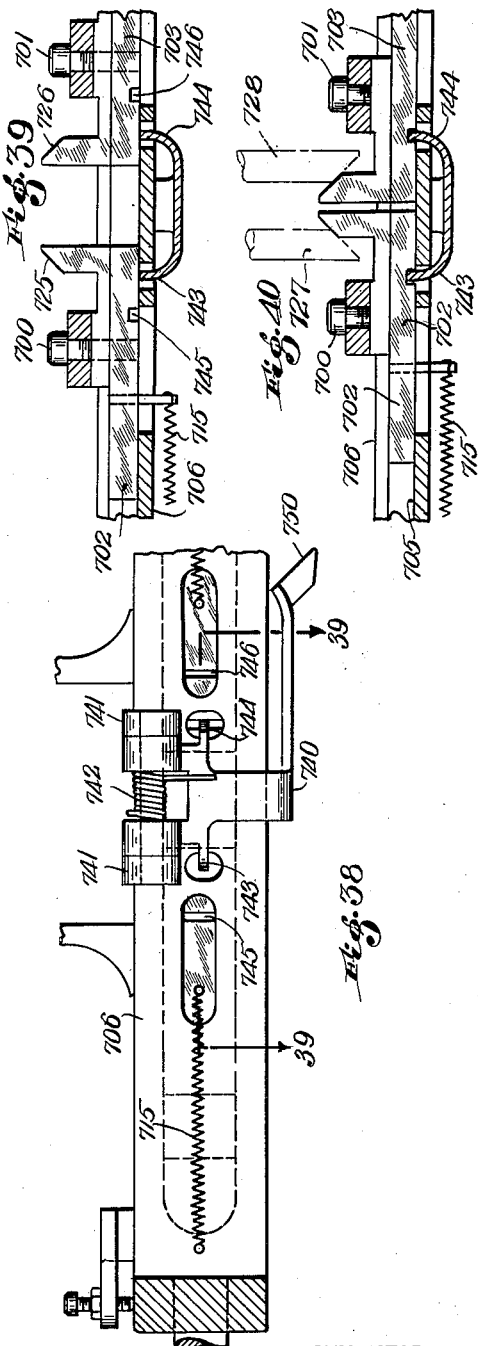

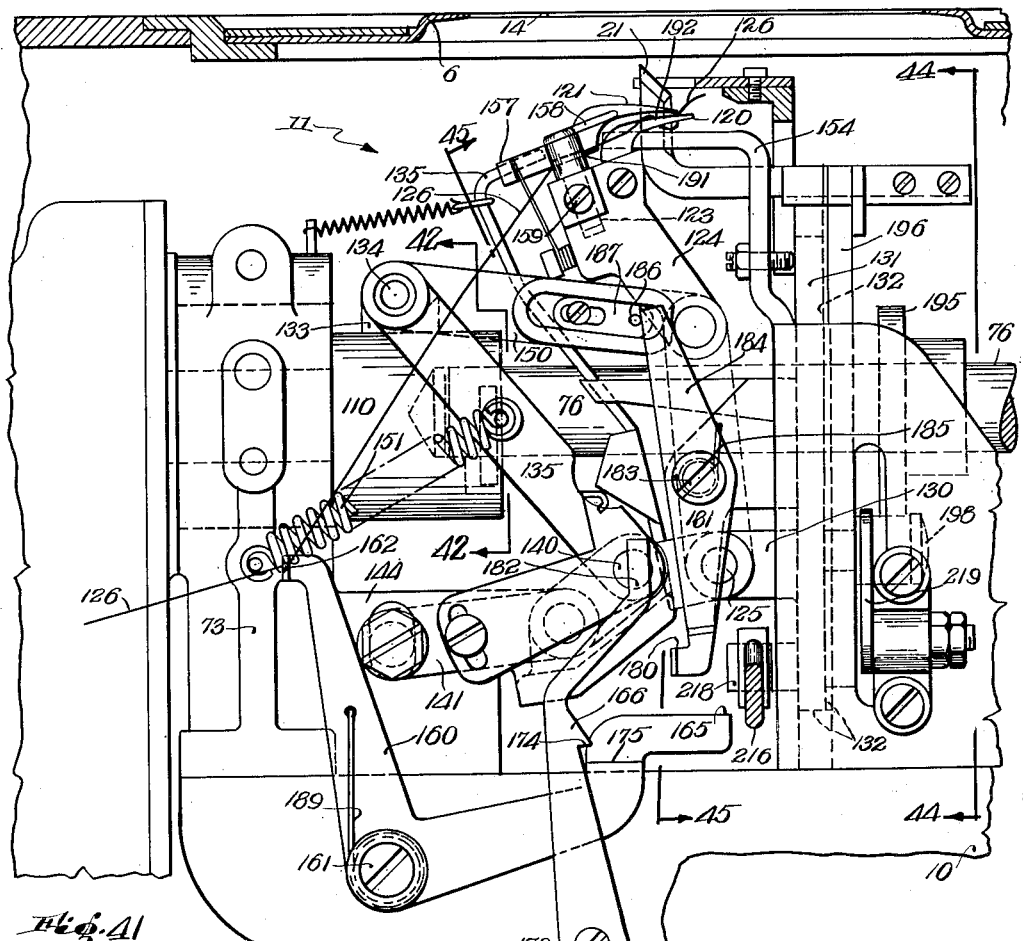

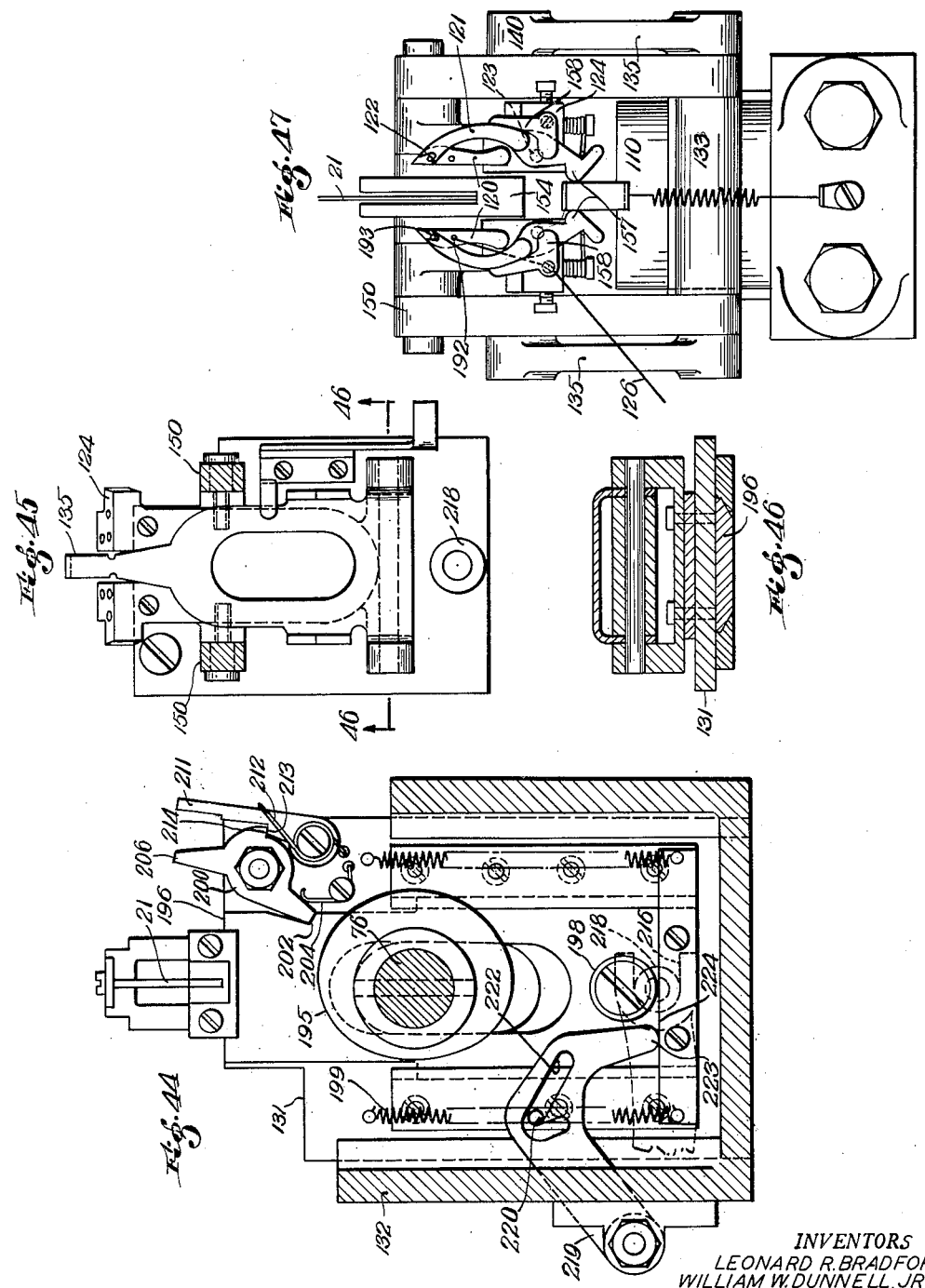

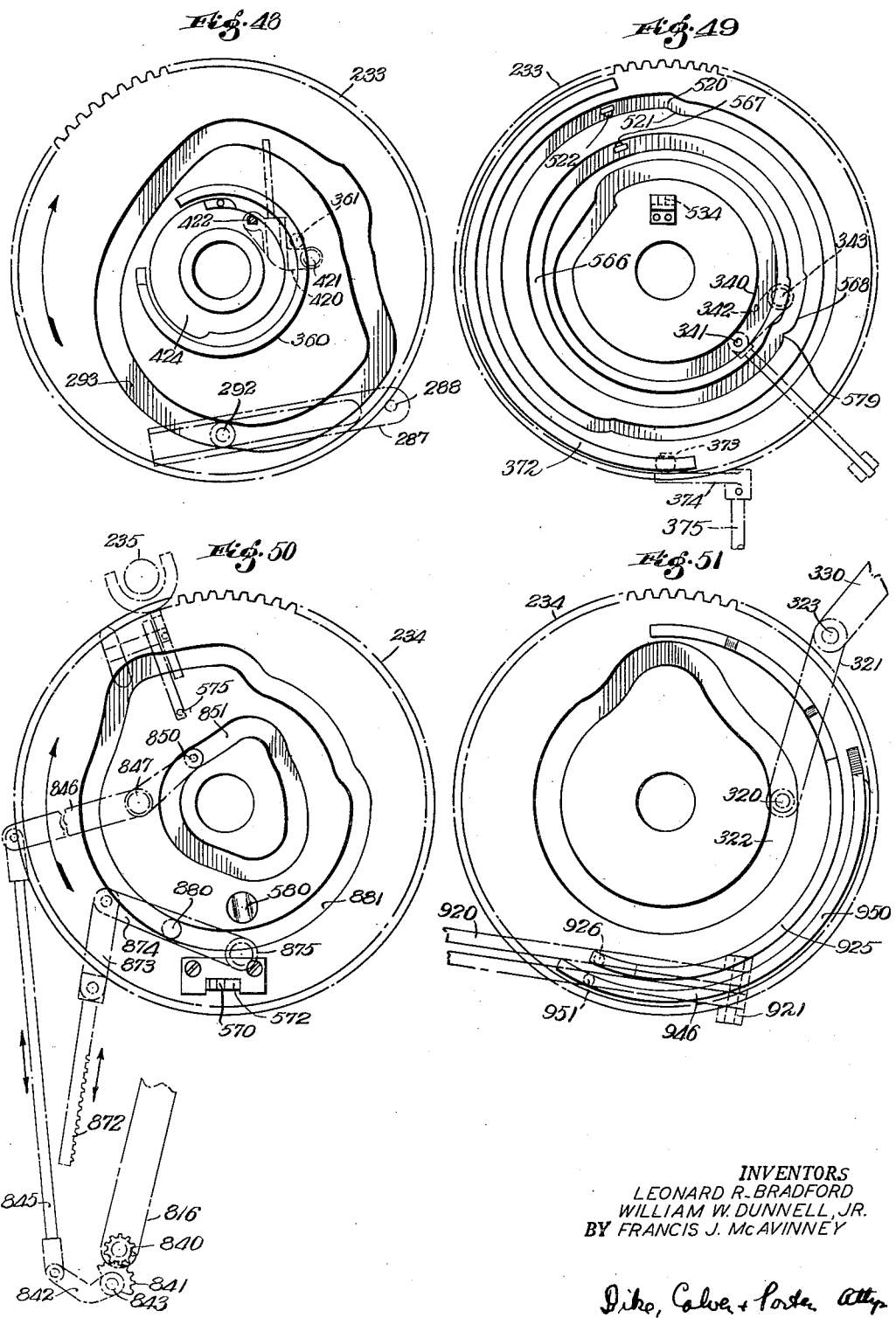

Nov. 7, 1950   L. R. BRADFORD ET AL   2,529,072
BUTTONHOLE SEWING MACHINE
Filed May 21, 1948   21 Sheets-Sheet 14
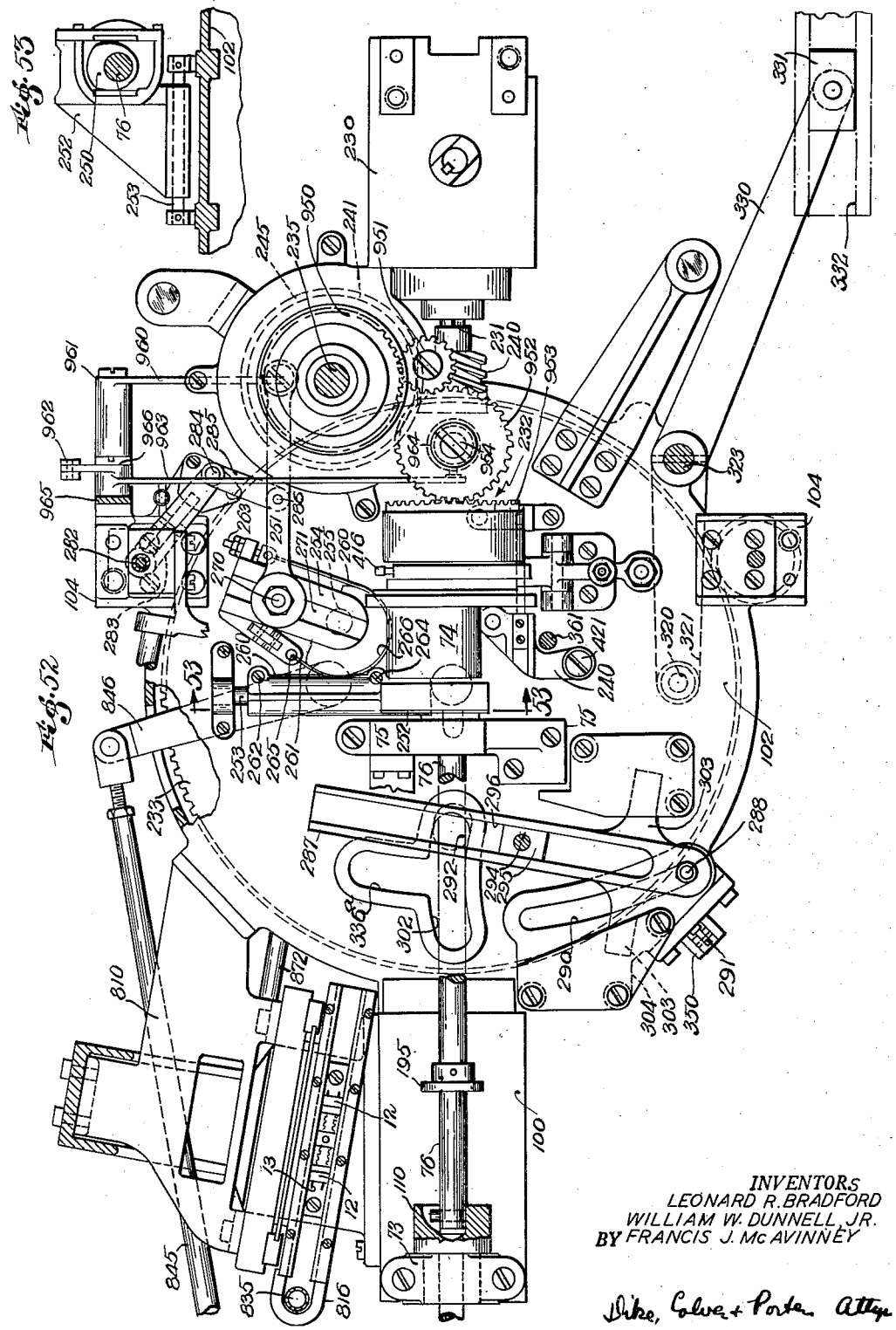
INVENTORS
LEONARD R. BRADFORD
WILLIAM W. DUNNELL, JR.
BY FRANCIS J. McAVINNEY
Dike, Calver + Porter Attys

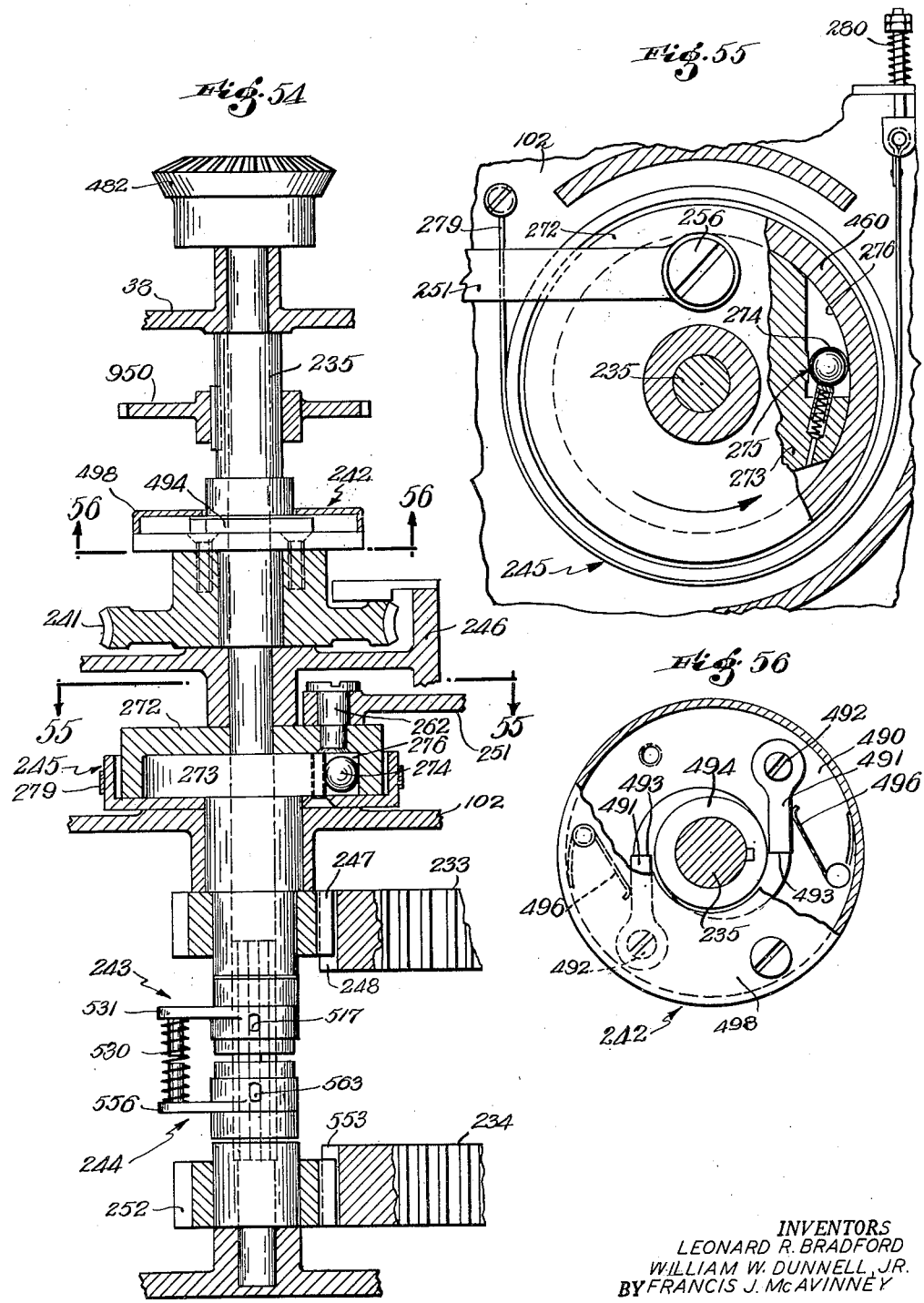

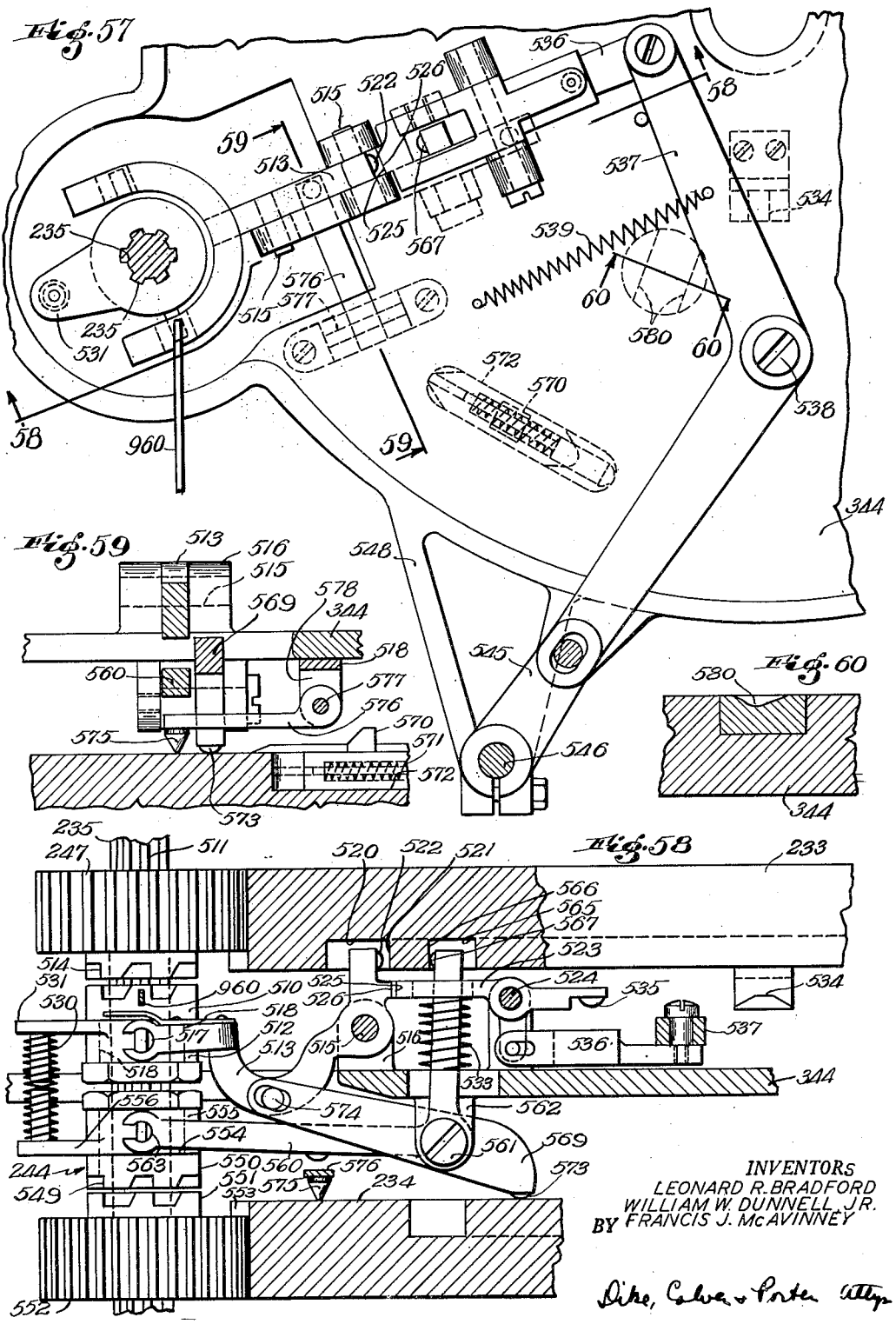

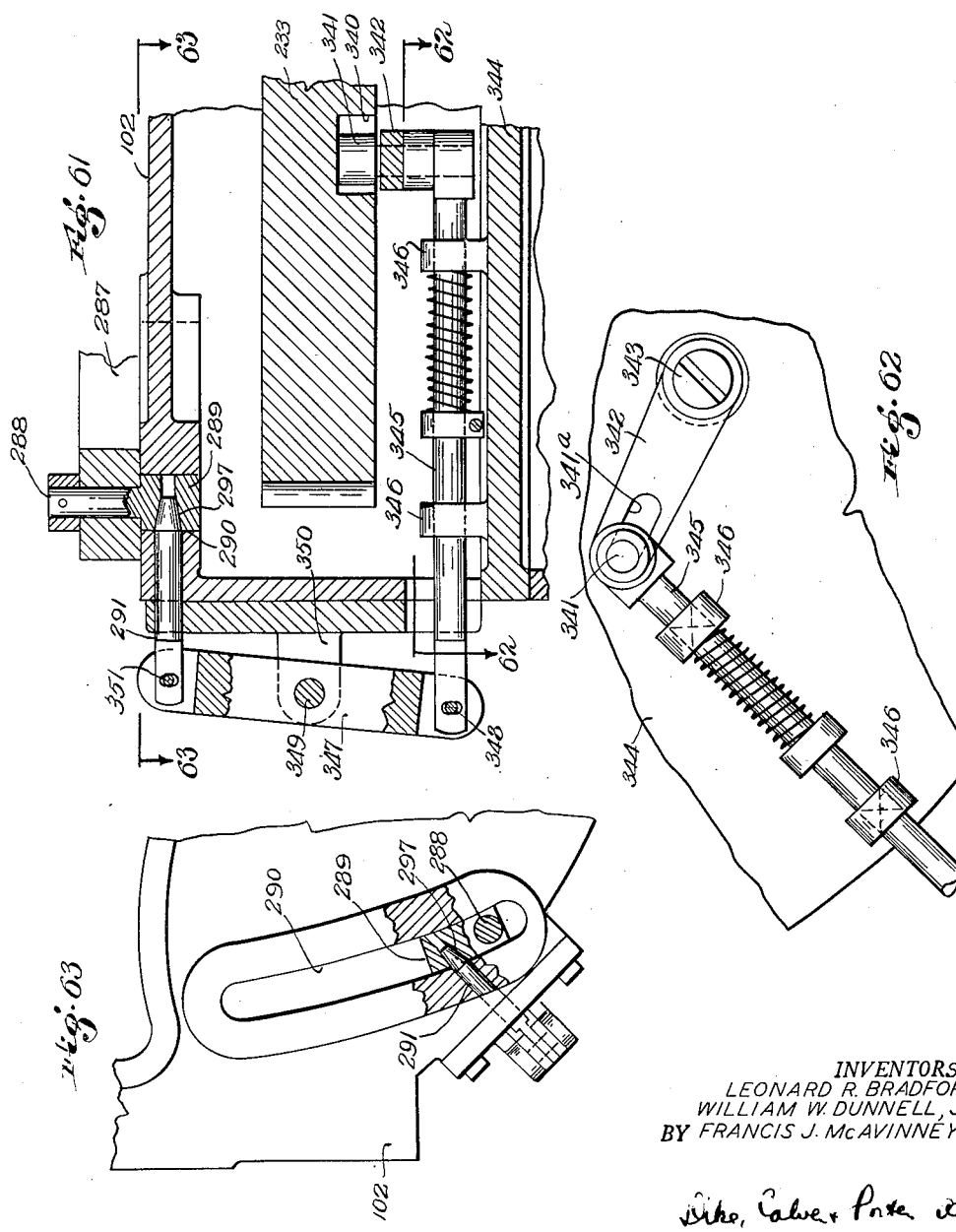

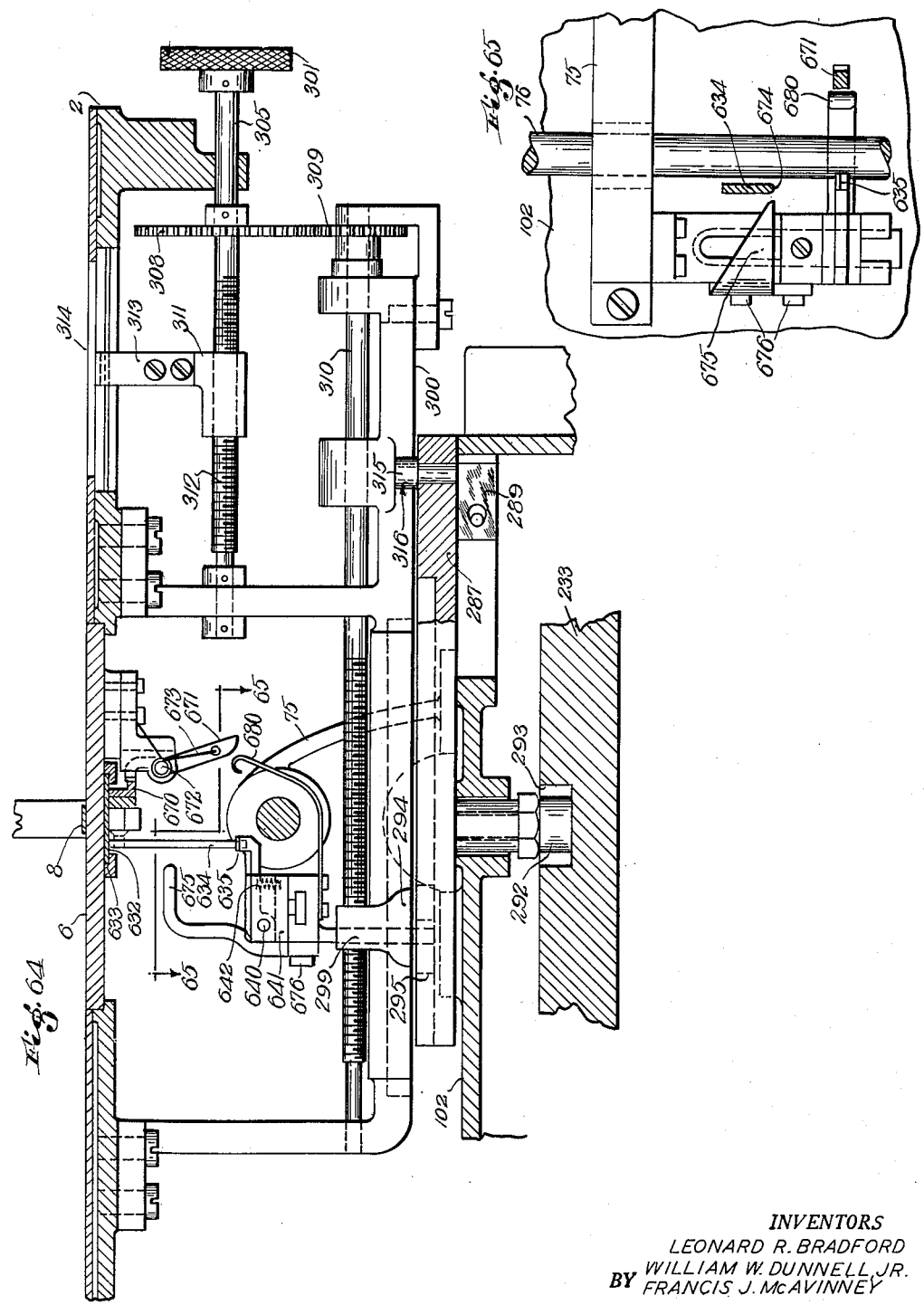

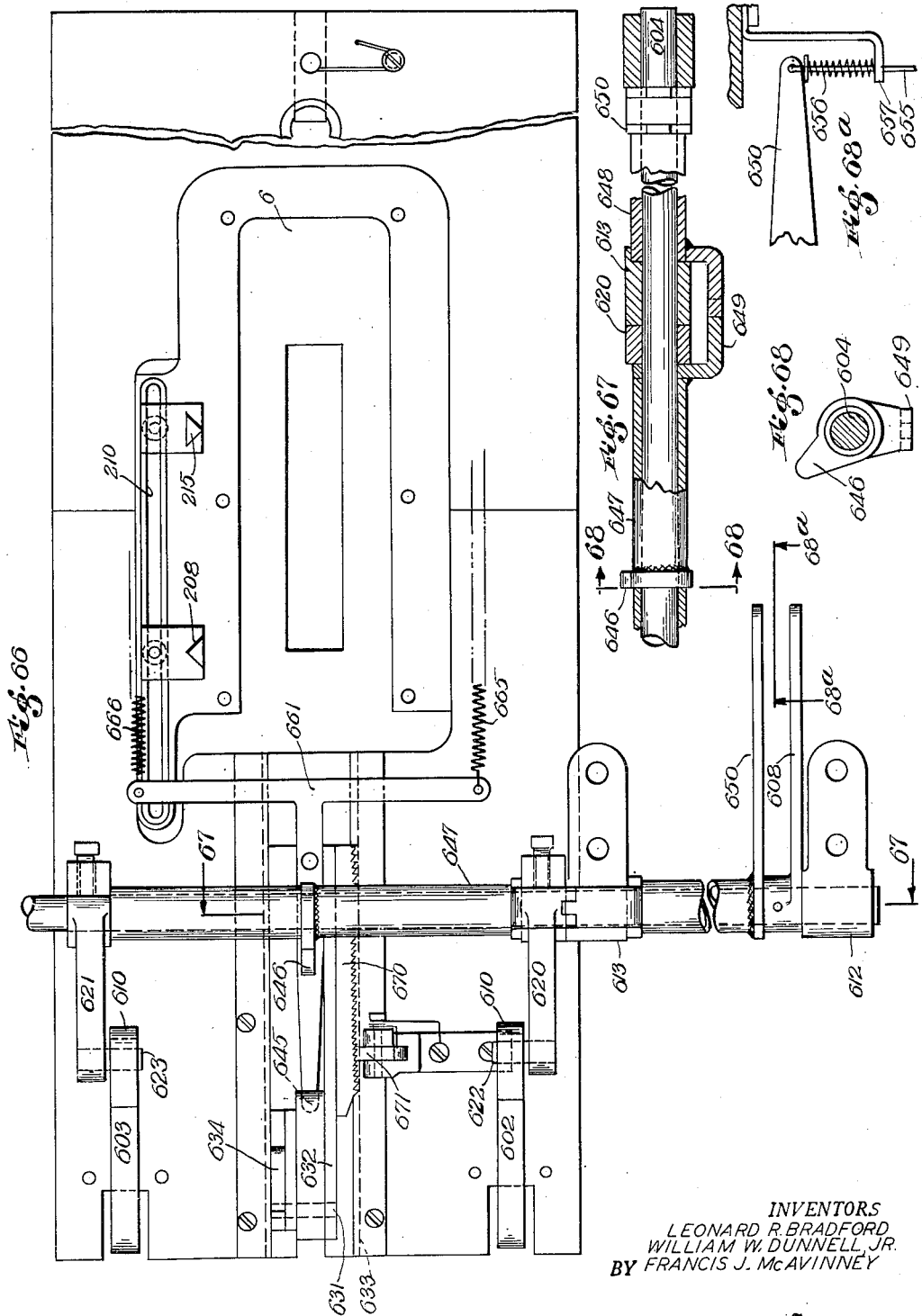

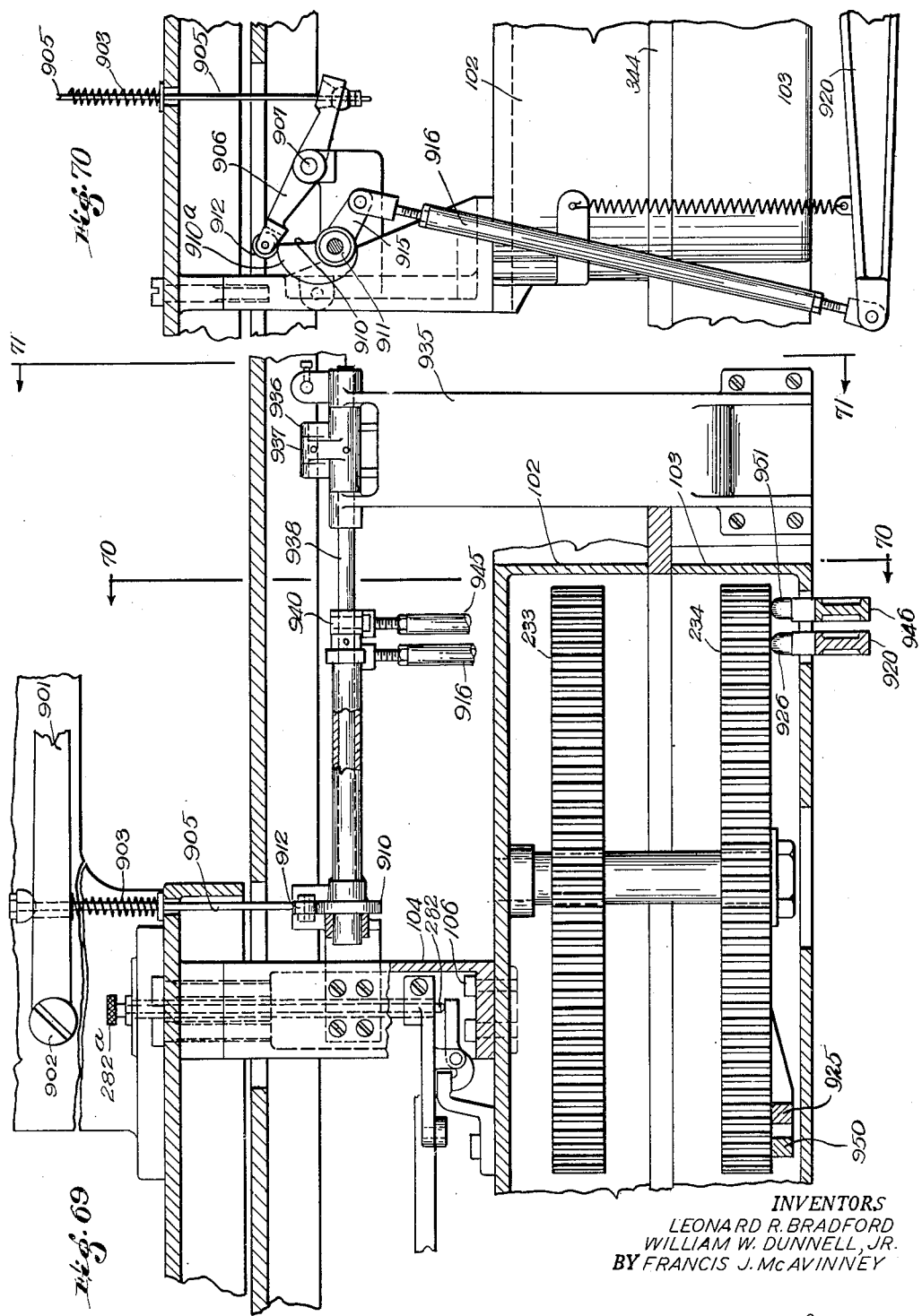

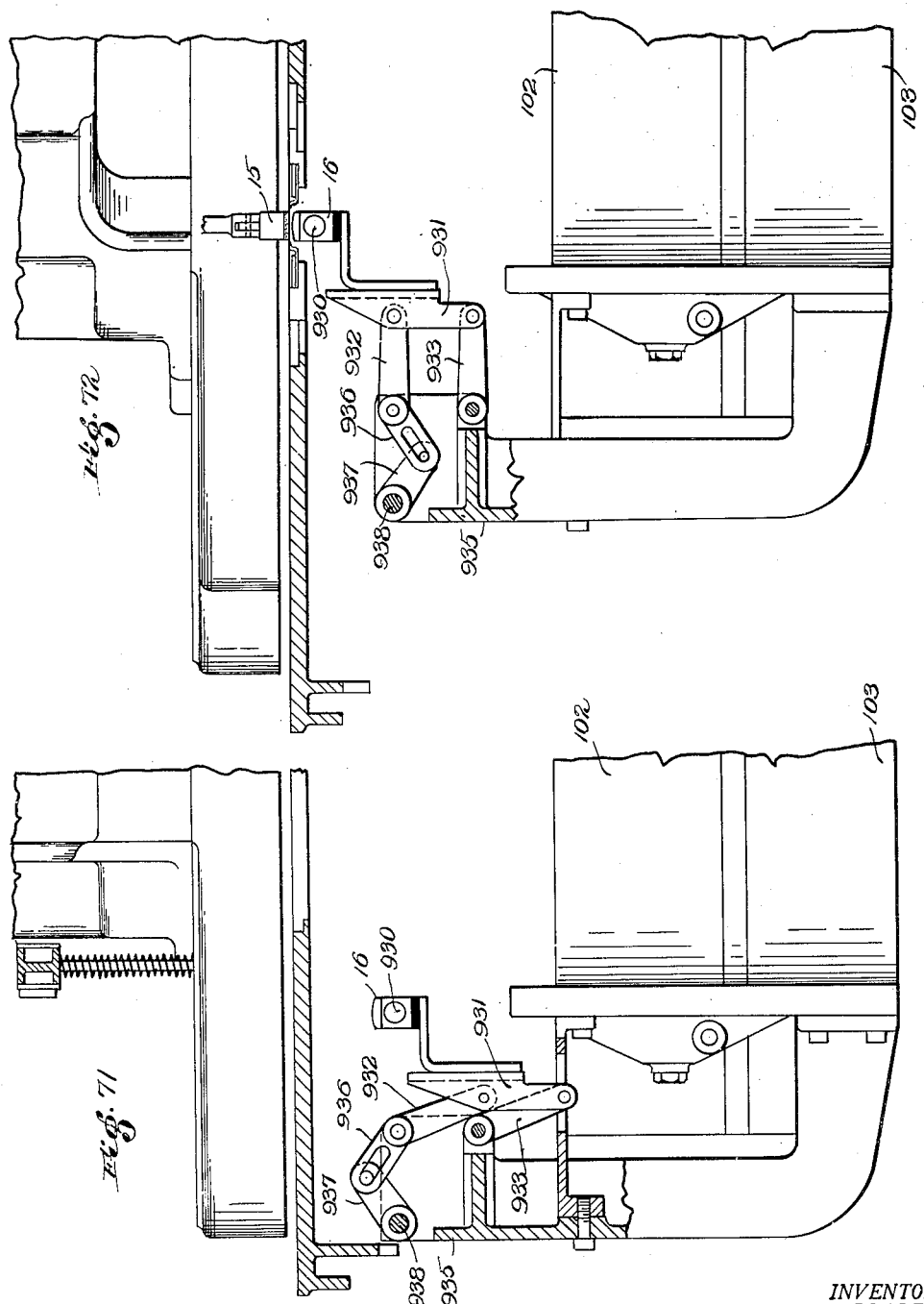

Patented Nov. 7, 1950

2,529,072

UNITED STATES PATENT OFFICE 2,529,072

BUTTONHOLE SEWING MACHINE

Leonard R. Bradford, Arlington, William W. Dunnell, Jr., Boston, and Francis J. McAvinney, Dorchester, Mass., assignors, by mesne assignments, to The Reece Corporation, Boston, Mass., a corporation of Massachusetts Application May 21, 1948, Serial No. 28,464

45 Claims. (Cl. 112—65)

This invention relates to sewing machines, and more particularly to a machine for forming holes finished around the margins of the hole with piping material, such as piped buttonholes, pockets, belt slits in trousers and skirts and the like in fabric and other material.

A piped buttonhole is one in which the material, for instance, cloth, is finished around the buttonhole slit by a piece of fabric or leather secured to the base material by concealed stitching. Such a buttonhole and one method of making it by hand is shown in the patent to Zilinsky No. 1,945,104 and in the drawings hereof. In making such buttonholes, the piping material, conveniently known as the patch, is secured to the base material, then passed through the slit and folded about the raw edge of the slit and finally laid back onto the back side of the base material, so that the raw edge is completely covered by the material of the patch and the stitching is concealed. Such buttonholes have an attractive neat appearance but their use has been confined usually to expensive high-grade clothing due to their cost.

Heretofore piped buttonholes have been made exclusively by hand as far as we are aware: the cause of their high cost and limited use only to certain types and grades of clothing.

In making piped buttonholes by hand the following steps are usually involved:

A straight buttonhole slit is cut at the desired location in the base material. Then another slit of the same length is cut in the center of a piping patch, and the patch is positioned upon the base material with the two slits registering. Then two edges of the patch are folded and laid over onto the patch toward its center so that the two folds thus formed lie parallel to and equidistant from the registering buttonhole slits on opposite sides thereof. Then the two folded edges of the patch are sewn to the base material with stitches through both the double layers of the patch folds and the material so that the lines of stitches are spaced between the slits and the folded edges. Then two pairs of short diverging and registering tab slits are cut at each end of the straight slits and angularly to them through the material and the patch, respectively, to form with the straight registering slits a Y shape at each end thereof and wedge shaped end tabs between each of the diverging tab slits of a pair. The straight slits are usually cut with a knife and the tab slits may be cut with scissors. The material and patch must be run through a sewing machine twice to sew each of the folded edges of the patch to the base material. Then the patch and part of the material on each side of the straight buttonhole slits including the lines of stitches are turned inside out through the straight slits and back against the underside of the base material so that the stitches are concealed on the top or front side of the base material. The superimposed wedge shaped end tabs which have been formed by cutting the tab slits are also turned through the tab slits at the ends of the straight slits and folded back against the underside of the base material, all of which as accomplished by the machine and method of this invention will be illustrated in the drawings and more fully described.

Therefore, making piped buttonholes by hand requires skill and dexterity and is tedious, confining work which takes a substantial length of time and consequently makes hand made buttonholes expensive and limits their use to high grade clothes.

Accordingly, our invention has for its objects to provide a fully automatic machine and method by which piped buttonholes and other piped holes may be made mechanically and more quickly than by hand, and the piped holes thus produced be more uniform and as good as or better than hand-made piped holes.

In using the machine of this invention, the operator simply places his base material in the machine and positions a flat patch over it. The machine is started and a piped buttonhole is the result in a matter of seconds.

These and other objects and advantages of the invention will best be understood from the following description of a machine and method for carrying them into effect, as illustrated in the accompanying drawings. As far as we are aware, this is the first time a machine to make a piped buttonhole or any other piped hole has been devised, consequently, the machine described and claimed comprises a wholly new combination of parts. The machine illustrated is constructed particularly for making buttonholes, but it is to be understood that it is adaptable to forming any piped holes such as pockets, belt slits and the like in fabric-like material. The particular constructions and operations described and shown have been chosen for purposes of exemplification and the invention as defined by the claims may be otherwise practiced without departure from the spirit and scope thereof.

In the drawings in which letters refer to the material and patch and numbers refer to the machine and its parts:

Fig. 12 is a sectional view of base material under the work clamp on the work plate and a piping patch on the patch folders under the center blade before the patch is pressed down onto the base material and folded.

Fig. 13 is a sectional view similar to Fig. 12 showing the center blade depressed and holding the piping patch on the base material.

Fig. 14 is a sectional view in perspective partly broken away showing the edges of the piping patch folded over the center blade by the folders, the needles sewing the patch to the base material under the work clamp, and the straight slit cutter in operation.

Fig. 15 is a top plan view showing the tab slit cutters spreading the straight slits and cutting diverging tab slits in the base material and piping patch.

Fig. 16 is a side elevation view of the patch turners moving down and turning the piping patch and material through the slits.

Fig. 17 is a side elevation view showing the patch turners after they have spread the ends of the piping patch under the base material and the pressers in operation.

Fig. 17a is a partial front elevation of the top of a patch turner showing the associated thread cutting knife for clearing the slit.

Fig. 18 is a side elevation view of the left side of the machine of the invention for making piped buttonholes.

Fig. 18a is a front elevation view partly in section showing details of the thread clamp and taken along the line 18a of Fig. 18.

Fig. 19 is a side elevation view partly in section and partly broken away of the right side of the machine of the invention.

Fig. 20 is a side elevation view in detail of the needle bar and upper thread take off in down position.

Fig. 21 is a front elevation view of Fig. 20 with the needle bar in up position.

Fig. 22 is a rear elevation view of the machine.

Fig. 23 is a top plan view of the machine.

Fig. 24 is a top plan view of operative mechanism of the machine in detail in the vicinity of the work plate.

Fig. 25 is a side elevation view of Fig. 24.

Fig. 26 is a side elevation view of the patch turner mechanism in down position.

Fig. 27 is a side elevation view of the patch turner mechanism in the up position.

Fig. 28 is a sectional view taken on line 28 of Fig. 26.

Fig. 29 is a sectional view taken on line 29 of Fig. 27.

Fig. 30 is a sectional view taken on line 30 of Fig. 28.

Fig. 31 is a sectional view taken on line 31 of Fig. 26.

Fig. 32 is a side elevation view partly in section of the sewing drive clutch and associated mechanism.

Fig. 33 is a sectional view taken on line 33 of Fig. 32.

Fig. 34 is a side elevation view of the clutch cam.

Fig. 35 is a top plan view of the control mechanism of the sewing drive clutch.

Fig. 36 is an end elevation view of the mechanism of Fig. 35.

Fig. 37 is a front elevation view of the patch folders and mechanism.

Fig. 38 is a bottom plan view of the mechanism in Fig. 37.

Fig. 39 is a sectional view taken on line 39 of Fig. 38.

Fig. 40 is a sectional view similar to Fig. 39 showing part of the patch folder mechanism in closed position.

Fig. 41 is a side elevation view of the right-hand side of the lower stitching mechanism.

Fig. 42 is a sectional view taken on line 42 of Fig. 41.

Fig. 43 is a side elevation view partly in section and broken away taken on line 43 of Fig. 42.

Fig. 44 is an end elevation view of the lower stitching mechanism partly in section taken on line 44 of Fig. 41.

Fig. 45 is a sectional view taken on line 45 of Fig. 41.

Fig. 46 is a sectional view taken on line 46 of Fig. 45.

Fig. 47 is a top plan view of the lower stitching mechanism.

Fig. 48 is a top plan view of the upper feed cam and associated mechanism.

Fig. 49 is a bottom plan view of the upper feed cam and associated mechanism.

Fig. 50 is a top plan view of the lower feed cam and associated mechanism.

Fig. 51 is a bottom plan view of the lower feed cam and associated mechanism.

Fig. 52 is a top plan view of the machine taken below the bed plate.

Fig. 53 is a sectional view taken on line 53 of Fig. 52.

Fig. 54 is a side elevation view partly in section of the upper and lower feed cam drive mechanism.

Fig. 55 is a top plan view broken away and partly in section taken on line 55 of Fig. 54.

Fig. 56 is a bottom plan view broken away and partly in section taken on line 56 of Fig. 54.

Fig. 57 is a top plan view of the upper and lower feed cam control mechanism mounted on the center plate.

Fig. 58 is a side elevation view of the feed cam control mechanism partly in section taken along the line 58 of Fig. 57.

Fig. 59 is a partial elevation view partly in section, taken on the line 59 of Fig. 57.

Fig. 60 is a sectional view taken on the line 60 of Fig. 57.

Fig. 61 is an elevation view, partly in section and broken away, showing the swing locking mechanism.

Fig. 62 is a top plan view of part of the mechanism shown in Fig. 61, taken on the line 62 thereof.

Fig. 63 is a top plan view which is broken away and partly in section taken along the line 63 of Fig. 61.

Fig. 64 is a front elevation view, partly in section and broken away, showing part of the longitudinal feed mechanism under the bed plate.

Fig. 65 is a top plan view, broken away and partly in section, taken along the line 65 of Fig. 64.

Fig. 66 is a bottom plan view of mechanism under the work plate.

Fig. 67 is an elevation view, partly in section, taken along the line 67 of Fig. 66.

Fig. 68 is an elevation view, partly in section, taken along the line 68 of Fig. 67.

Fig. 68a is a fragmentary elevation view of part of the mechanism for raising the center blade.

Fig. 69 is an elevation view, broken away and partly in section, showing the mechanism for actuating the upper presser.

Fig. 70 is an elevation view, broken away and partly in section, taken along the line 70 of Fig. 69.

Fig. 71 is a front elevation view, broken away and partly in section, showing the lower presser mechanism and the lower presser in inoperative position, taken on the line 71 of Fig. 69.

Fig. 72 is similar to Fig. 71 and shows the upper and lower pressers in operative position with the stitching mechanisms swung away from the work.

The operation of the machine of the invention will be more easily understood by considering first the steps of the novel method of forming piped buttonholes performed by the machine, these steps being different than those customary in the manufacture of piped buttonholes by hand.

Figures 1–11 illustrate a buttonhole in its progressive stages of formation.

Figure 1:
Fig. 1 is a sectional view of a piping patch positioned above the base material.
Figure 2:
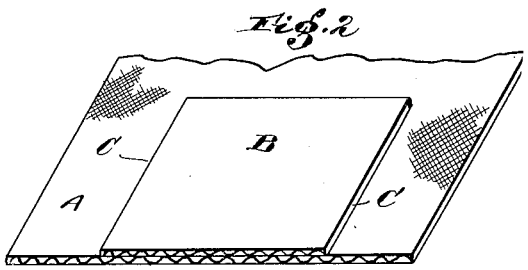
Fig. 2 is a perspective view of a piping patch positioned on the base material.
Figure 3:
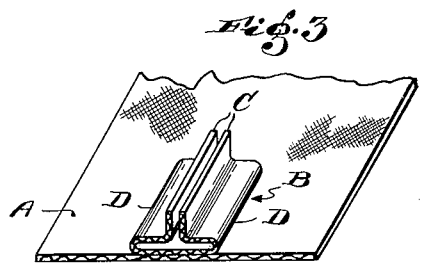
Fig. 3 is a sectional view in perspective showing a piping patch positioned and folded on the base material ready for stitching.
Figure 4:
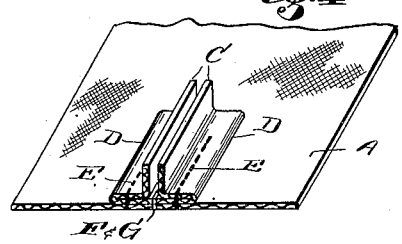
Fig. 4 is a sectional view in perspective of a folded piping patch sewn to the base material showing the straight registering slits.
Figure 5:
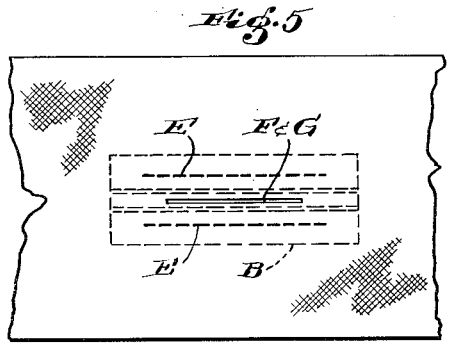
Fig. 5 is a bottom plan view of a folded piping patch sewn to the base material showing the straight registering slits.

Base material A in which a piped buttonhole is to be formed is positioned and clamped flat in the machine and a piping patch B is placed over the place where the buttonhole is to be located, and then moved down into contact with the base material, Figs. 1 and 2. The raw edges C of the patch are then simultaneously folded upwardly, and then back over the patch toward its center and finally upwardly again so that the patch assumes the shape of an inverted T against the base material and has two folds D, Fig. 3. Two lines of stitches E are now simultaneously formed through the folds D and the base material A extending substantially the length of the folds D, Fig. 4. After the sewing starts and at a predetermined spaced distance from the beginning ends of the lines of stitches E (which may be either end in the figures shown), a pair of registering straight buttonhole slits F and G in the base material A and patch B respectively are simultaneously cut by a progressive cutting operation which is cooperatively timed and partly concurrent with the simultaneous sewing operation Figs. 4 and 5. The slit cutting commences after sewing begins, progresses during sewing, and ceases before sewing is completed so that the lines of stitches E overextend the straight slits F and G at each of their ends for a fixed and adjustable distance as desired, Fig. 5.

Figure 6:
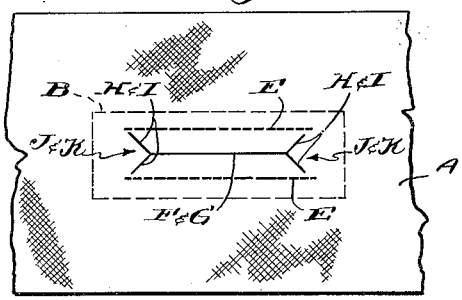
Fig. 6 is a bottom plan view similar to Fig. 5 showing the registering tab slits and end tabs as well as the straight slits.
Figure 8:
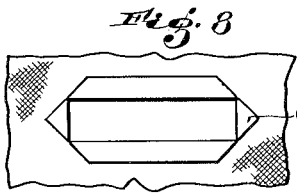
Fig. 8 is a bottom plan view of the base material after the piping patch and material have been turned through the slits and with the piping patch removed (for purposes of illustration).
Figure 9:
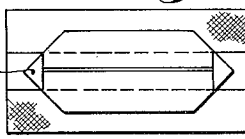
Fig. 9 is a top plan view of a piping patch which has been removed from the base material (for purposes of illustration) after it has been turned through the slits.

Diverging pairs of registering tab slits H and I, Fig. 6, in the base material A and patch B, respectively, are now cut in simultaneous operations at the respective ends of the straight buttonhole slits F and G to form a Y shape at each end thereof and superimposed wedge shaped tabs J and K, Figs. 6, 8 and 9 in both the base material A and the patch B.

Figure 7:
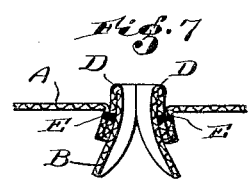
Fig. 7 is a sectional view of a piping patch and part of the base material being turned through the slits.
Figure 10:
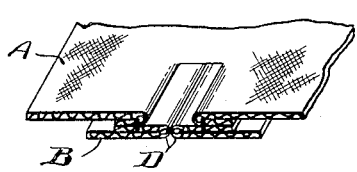
Fig. 10 is a section view in perspective of a finished piped buttonhole.
Figure 11:
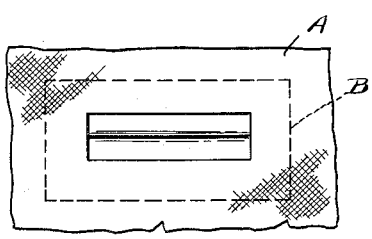
Fig. 11 is a top plan view of a finished piped buttonhole.

The patch is now turned inside out through the slits Fig. 7. In so doing the entire patch B, the lines of stitches E, part of the material A on both sides of the slit F, and the tabs J and K are now dragged down through the slits and laid back flat against the underside of the base material A, Figs. 8, 9 and 10 so that the stitches E are now entirely concealed, from the top or front side of the base material. The part of the patch B which is now under the base material A has a tendency to lie back flat under and against the material after being turned, but in the case of some patch and base materials it is necessary to hold the tabs J and K and the ends of the patch back, Fig. 17, in a manner to be described. The patch and the material surrounding the buttonhole are now pressed so they will stay in place. This completes the buttonhole as far as the present invention is concerned.

In the drawings, Figs. 18, 19, 22 and 23 are shown various general views of a piped buttonhole machine embodying the invention and capable of performing the novel process described.

This machine is partly above and partly below a bed plate 2 and is driven by an electric motor 5 mounted above the bed plate. The work plate 6, Figs. 23 and 24 is mounted in the bed plate 2 near the front end of the machine and the base material A and piping patch B are first positioned over and then operatively moved relative to an aperture 14 in the work plate 6 as the piped buttonhole is being formed. In general, the parts of the machine which operate directly upon the work are: a work clamp 7, Figs. 12, 13, 14, 23, 24 and 25; a center blade or patch holder 8, Figs. 12, 13, 14, 24, 25 and 64; a pair of cooperating patch folders 9, Figs. 12, 13, 14, 18, 19, 24, 25 and 37; upper and lower stitching mechanisms generally indicated at 10 and 11, Figs. 18, 19, 23 and 41–47; a slit cutter 21 conveniently associated with the lower stitching mechanism 11, Figs. 14, 41, 44 and 47; a pair of patch turning fingers 12 which may conveniently be called patch turners, Figs. 16, 17, 26 and 52; tab slit cutters 13 which are mounted just below and move with the patch turners 12, Figs. 15, 16, 26, 31, and 52; and pressing members 15 and 16, Figs. 17, 18, 19, 23, 71 and 72.

GENERAL CONSTRUCTION AND OPERATION OF THE MACHINE

The base material A in which the piped hole is to be formed is placed on the work plate 6 under the raised work clamp 7 which is lowered to hold it securely in place with the location of the buttonhole to be formed centered over the aperture 14 in the work plate 6. A piping patch B is then placed flat under the raised center blade 8 and on the patch folders 9 above the base material A, Fig. 12. The center blade 8 is depressed and holds the patch B firmly on the base material A, Fig. 13. The patch folders 9 then move in from the sides over the center blade 8, and fold the edges C of the patch B upwardly over the edges of the center blade 8 so that the patch lies in the position shown in Fig. 14 and forms an inverted T. The stitching mechanisms 10 and 11 (of which only the needles 32 are shown in Fig. 14) sew two lines of stitches E simultaneously to fasten the folds D of the patch B to the base material A. The straight slit cutter or knife 21, Fig. 14, mounted on the lower stitching mechanism 11 reciprocates vertically as the stitching progresses lengthwise of the buttonhole being formed and cuts the straight registering buttonhole slits F and G in the base material A and patch B, respectively as described above herein.

When sewing is completed, the stitching mechanisms 10 and 11 are swung horizontally out of the way of the work and the patch turners 12 and tab slit cutters 13 move into position under the aperture 14 in the work plate 6. Then the patch turners 12 and the tab slit cutters 13 rise through the slits F and G near their ends. The fingers 12 have knives 17, Fig. 17a, on their upper ends which aid their introduction into the slits by cutting the few threads, which, in certain material, may remain lengthwise in the slits after they have been cut. They spread the slits and then the tab slit cutters 13 spread apart as they rise, Fig. 15, and cut the registering pairs of diverging tab slits H and I forming the wedge shaped tabs J and K, in the base material A and patch B, respectively, as described above herein. The cutters 13 are parallel and so are the slits H and I while they are being cut, but when the tension has been released in the material A and patch B which was placed therein by the introduction of the patch turners 12 and cutters 13, the tab slits H and I then become diverging.

The patch turners 12 are made preferably of rubber or some other suitable soft material capable of exercising a drag on the cloth and they have a serrated or toothed shape adopted to engage the base material A adjacent the slits F and G and H and I and patch B to pull them down through the slits when they are lowered, Fig. 16. The upper ends of the fingers 12 are adapted to spread the ends of the patch B under the material A at the end of the turning operation and to hold them in position for the pressing operation which follows turning, Fig. 17.

When the fingers 12 and tab slit cutters 13 have risen fully and spread, they then move back downward through the slits while still in spread position. During this downward movement the fingers 12 engage the patch B, some of the base material A, including the stitches E, and tabs J and K and drag them down through the slits F, G, H and I, Figs. 7 and 16.

After the turners 12 have passed back down through the slits F and G they spread farther and wipe the ends of the patch B away from the ends of the slits and against the underside of the base material where they are held for the pressing operation, Fig. 17. Thereupon the upper presser 15 and the lower presser 16 come together in the area of the material about the slit and press the buttonhole and the material about it.

The elements of the machine relating to the patch folding, stitching, and straight slitting operations are, in general, actuated by a motor driven sewing drive shaft 76 which is horizontally mounted in the machine illustrated, and a large horizontal upper feed cam 233 to actuate the patch folding mechanism and feed the stitching mechanism relative to the work during sewing, and the elements relating to tab slitting, patch and material turning, end tab and patch end holding and buttonhole pressing are in general actuated by a large lower feed cam 234 mounted under the first, which also swings the stitching elements out of the way for the operations following their use and positions the patch turning fingers and tab slit cutters for operation as will be more fully described. The operations are mechanically cooperative and in timed sequential relation so that the machine forms buttonholes in a fully automatic operative cycle.

UPPER STITCHING MECHANISM

The upper stitching mechanism 10, Figs. 19, 20 and 21, is mounted in a supporting housing 30 and includes a pair of needles 32 each having an eye 34 and a thread 36 through said eye. The housing 30 is attached to a table 38 which is longitudinally movable on rollers 40 relative to a pivoting table 42 and the bed plate 2, Fig. 19. The pivoting table 42 is mounted through a pivot 44 to the bed plate 2 and its weight and that of the structure supported by it is carried on rollers 46 which are mounted on the bed plate 2.

A vertically reciprocating needle bar 50 is mounted in the housing 30 and upon its lower end is a double needle clamp 52 carrying the two needles 32. The needle bar 50 is pulled down by a steel band 56 and moved in the other direction by a spring 78. The band 56 is attached at one end to a collar 60 on the top of the needle bar 50, and runs over a pulley 62. The steel band is moved to and fro by a pivotally mounted rocker arm 66 which is moved to the right by an adjustable tappet head 70 on a tappet 72 which is slidable vertically in the table 38 and is itself moved by a cam 74 on the sewing drive shaft 76. This shaft is horizontally mounted to rotate in journals 73 and 75 on structure under the bed plate 2, Fig. 52, and is driven by the motor 5 during sewing. When the sewing drive shaft 76 is rotated to turn the cam 74, the needles 32 are reciprocated vertically through the aperture 14 in the work plate 6 during the sewing operation.

The upper threads 36, Fig. 18, are led from a convenient source above the machine through a thread clamp 79 mounted on the outside of the housing 30, which clamps the thread when sewing is finished so it can be broken off without pulling through from the source. The thread clamp 79, Fig. 18a, comprises a slidable shaft 81 through the housing 30 and a cross bar 82 on the shaft 81 which clamps the upper thread 36 against a pair of bosses 83 which have slots 84 through which the threads run and grooves 85 in which the cross bar 82 seats. The shaft 81 is spring urged when the machine is not sewing to jam the cross bar 82 against the threads 36 by a spring 86 pressing against a bevelled cam head 87 on the inside end of the shaft 81. Just prior to the first stitch a pivotally mounted rocker arm 88, Figs. 18a and 19, having a cam surface 89 and mounted inside the housing 30 on a pivot 90 is rocked to wipe across the cam head 87 and push and hold the shaft 81 and cross bar 82 outwardly to release the thread 36 during sewing. The arm 88 is moved by a rod 105 which is connected to an arm 730 so that they move together as will be further described.

From the thread clamp 79 the threads 36 are led through a pair of adjustable thread tensions 91 each of which may comprise a pair of disks which are adjustably spring pressed together to hold the threads in tension between them and which may be any of the well known types of adjustable thread tensions. The threads 36 pass through holes 92 in the bottom of the housing 30 and thence through a pair of eyes 93 in a bracket 94, through eyes 95 in a thread take off 96, Figs. 20 and 21, through passages 97 in the needle clamp 52 and thence through the needle eyes 34. The thread take off 96, Figs. 19–21, operates reciprocally with the needle bar 50 to take off enough thread from the tensions 91 for each stitch. It is moved downwardly by a pin 98 on a projection 99 of the needle clamp 52 and upwardly by a spring 108 between the housing 30 and a head 109 on a shaft 112 attached to the thread take off 96.

The upper and lower stitching mechanisms 10 and 11 comprise the well known double thread chain stitch system, that is, for each thread carried by the two upper needles 32, a cooperating lower thread 126 is carried by the lower stitching mechanism 11 to form simultaneously the two lines of chain stitches E. For this purpose, two pairs of threads 36 and 126 are led into the machine.

LOWER STITCHING MECHANISM

As seen in Figs. 41–47 the lower stitching mechanism 11 is actuated by a cam 110 on the sewing drive shaft 76. It comprises a pair of well-known loopers 120 each reciprocating to cooperate with a needle 32 which comes down reciprocally adjacent thereto during sewing to form chain stitching in the base material A and patch B.

Cooperating with each looper 120 is the usual spreader 121 having a forked tip 122 to engage a lower thread 126 so that when the spreader 121 is moved inwardly about its pivot 123 it spreads the lower threads 126 for the passage of a needle 32 and upper thread 36 to form chain stitches E. Although the loopers 120 and spreaders 121 are well known in the art, their assembly, drive motion and cooperative adaptation in this machine are novel.

The loopers 120 and spreaders 121 are mounted upon a looper carrier 124 which is pivoted at 125 on a bracket 130 attached to a plate 131. The plate 131 is mounted in a vertical slideway 132 attached to the housing 100 so that it may be raised into operating position, and lowered thereafter for a purpose to be described.

A cam follower 133 is pivotally mounted at 134 on a bracket 135 which is in turn pivoted at 140 on a bracket 141. The bracket 141 is adjustably mounted to extensions 144 on the shaft journal 73. The cam follower 133 is raised and lowered by the cam 110 in an arcuate path about the pivot point 140 and transfers an arcuate motion to the looper carrier 124 through a pair of arms 150. Thus, when the sewing drive shaft 76 is rotated, the loopers 120 are actuated. The loopers 120 and spreaders 121, therefore, oscillate generally horizontally in an arcuate path about the pivot 125. The timing is arranged so that the loopers 120 and spreaders 121 move in cooperation with the reciprocation of the needles 32.

A spring 151 between the bracket 135 and the shaft journal 73 is tensioned to hold the cam follower 133 firmly down on the cam 110.

A spreader cam 154 is adjustably mounted upon the plate 131. When the looper carrier 124 is reciprocated, the cam 154 makes contact with extensions 157 of the spreaders 121 to actuate them inwardly to spread loops in the thread 126 for the introduction of the needles 32. The spreaders 121 are held down in place by stops or holders 158 on the looper carrier 124.

A pair of lower thread take off arms 160 are fast on opposite ends of a shaft 161 in the housing 100 (there being one for each lower thread 126) so that they may move pivotally together and they are actuated to take off some lower thread 126 prior to the first stitch. Each take off arm 160 has a thread eye 162 through which a lower thread 126 passes on its way to a looper 120. When the looper carrier 124 and its supporting plate 131 are lowered in the slide way 132 after a sewing operation, an arm 184 on the plate 131 strikes one end 165 of the take off arm 160 and lowers it thus swinging the other end thereof to the right. A locking arm 166 is pivotally mounted at 170 on the housing 100 and held by a spring 171 between it and the housing 100. When the end 165 of the take off arm 160 is moved down, a projection 174 on the arm 166 catches a shoulder 175 on the arm 160 to hold it in position until it is released for the first stitch when a new sewing operation commences.

After the lower stitching mechanism 11 is again raised into operating position and when it is actuated to commence a new sewing operation, a projection 180 on an arm 181 strikes the upper end 182 of the locking arm 166 and throws it to the left to unlock the lower thread take off arm 160. The spring 189 throws the arm 160 to the left. This has the effect of taking off some lower thread 126 and loosening it for the beginning of the sewing operation. The arm 181 is pivoted at 183 and its upper end 184 is held by a spring 185 to the left against a pin 186 on a plate 187 which is adjustably mounted on the arm 150.

Each of the lower threads 126 may be led from a convenient source under the machine. Fig. 41 shows the course of one of the lower threads 126 which is first led from its source through a tension 190 (there being one for each thread) which may conveniently be of the same type as the upper tensions 91, and well known in the art. From the tension 190 the thread passes through the eye 162 of the take off arm 160 and then through a passage 191 in the spreader stop 158, thence down through an eye 192 in the looper 120 and up again through a looper eye 193 above which it is engaged by the notch 122 in the spreader 121. The friction of the thread 126 in the looper mechanism holds it sufficiently to prevent its being drawn back through when the take off arm 160 operates so that the arm 160 draws off thread from the source when it operates when sewing commences.

BUTTONHOLE STRAIGHT SLIT CUTTER

The slit cutter 21, Figs. 14, 41, 44 and 47, is mounted on the lower stitching mechanism 11 and reciprocates vertically and progresses with it lengthwise of the buttonhole during sewing to cut the registering straight buttonhole slits F and G in the base material A and patch B, respectively, during part of the sewing operation so that the lines of stitches E over-extend the slits F and G at both ends as described above herein. The cutter 21 is actuated by a cam 195 on the sewing drive shaft 76. It is mounted on a plate 196 which is slidable vertically on the plate 131 which carries the loopers. A cam follower 198 on the plate 196 is under the cam 195 and engaged by it and it is held upwardly against the cam by springs 199 when in operative position. The cutter 21 is normally held down in inoperative position except when it cuts the slits by a trip lug 200 pivoted on the plate 131 and engaging a notch 202 in the plate 196 and held therein by a spring 204. After sewing commences and the lines of stitches E have been started the upper end 206 of the lug 200 strikes against a wedge cam 208 Fig. 66 projecting downwardly under the bed plate 2 and adjustably mounted relative thereto in a slot 210 throwing the lug 200 out of the notch 202. The plate 196 carrying the cutter 21 is raised by the springs 199 so that the cam follower 198 can be engaged by the cam 195. The cam then reciprocates the cutter to cut the slits F and G.

When the lug 200 is thrown out of the notch 202, it is held out during cutting by a latch 211 which is urged toward it by a spring 212 so that a shoulder 213 thereon engages a shoulder 214 on the lug 200. When the slits F and G are cut, the latch 211 strikes a wedge cam 215, Fig. 66 projecting down from the bed plate 2 where it is adjustably positioned in the slot 210. The latch 211 releases the lug 200 which then re-engages the notch 202 and slit cutting ceases after which sewing is completed. By adjusting the positions of the cams 208 and 215 in the slot 210 on the bed plate 2, the desired slit length can be obtained.

When the sewing operation is completed, the entire lower stitching mechanism 11, mounted on the slidable plate 131, including the slit cutter 21 is lowered in the slideway 132 by an arm 216, Figs. 19, 41 and 44 which is yoked to a projection 218 on the sliding plate 131. The stitching mechanism 11 and cutter 21 are lowered in order that they may clear the bed plate 2 so that the stitching mechanisms 10 and 11 may be swung out of the way of the operations subsequent to sewing as will be further described. When the plate 131 is lowered by the arm 216, the cutter 21 which projects above the loopers 120 and spreaders 121 is lowered through a greater relative distance by means of a pivoted lever arm 219, Fig. 44, moved by a pin 220 on the plate 131 riding in a slot 222 in the arm 219. The end 223 of the arm 219 bears upon a projecting plate 224 on the plate 196 so that when the plate 131 is lowered, the leverage of the arm 219 in turn lowers the plate 196 a greater distance, so that the upwardly projecting cutter 21 will also clear the bed plate 2.

STITCHING DRIVE

The motor 5 is connected to drive the sewing drive shaft 76 through a gear box 230, Fig. 52, a stub shaft 231 and a sewing drive clutch indicated at 232 which is automatically engaged and disengaged. The sewing drive clutch 232, Figs. 32–36, is self engaging and operates normally engaged to drive the shaft 76 except when it is stopped and held out of engagement by mechanism to be described. It comprises an external driving sheave 390 fixedly mounted on the shaft 231. An internal driven element 391 with a flange 392 is fixedly mounted upon the drive shaft 76 and floats upon the driving shaft 231. A cam 393 having a pair of cam surfaces 394 and an externally projecting finger 396 floats upon the driven element 391 and rotates with it when the clutch is engaged. Both are spaced from the driving sheave 390 by a spacer bushing 395. Mounted upon the flange 392 is an external ring 397 which has a slot 398 within which the finger 396 may move so that the cam 393 may move rotatably relative to the driven element 391, within the angular limits of the slot 398. The external end of a flat coil spring 400 is secured in a groove 401 in the inside of the external ring 397 and the inside end of the spring 400 is secured in a groove 402 in one end of the cam 393. The spring 400 urges the cam 393 and its finger 396 toward the advanced end of the slot 398 in the ring 397, in the direction of rotation of the drive shaft 76. A pair of internal clutch shoes 405 and 406 are mounted upon pivots 407 and 408, respectively, which are secured fixedly to the external ring 397. Each of the shoes 405 and 406 has a roller 409 and 410 which rides on a cam 394. The cam surfaces 394 are so disposed that when the cam 393 is held advanced by the spring 400 in the direction of rotation, the cam surfaces 394 expand the clutch shoes 405 and 406 outwardly against the driving sheave 390 to engage the clutch. The rollers 409 and 410 are secured in the clutch shoes 405 and 406 by pins 411. The clutch 232 is, therefore, normally engaged to drive the shaft 76 when the motor 5 is energized as long as the cam 393 and its finger 396 are allowed to remain held advanced by the spring 400 in the direction of rotation.

A stop finger 415 is operated by a spring 417 to engage and stop rotation of the cam finger 396 which retards the cam 393 relative to the driven member 391 against the spring 400, and disengages the clutch 232. As the cam finger 396 retards, the cam 393 rotates relative to the rollers 409 and 410 so that the clutch shoes 405 and 406 contract about their pivots 407 and 408 and disengage from the driving sheave 390. When the finger 396 has been retarded to the rear of the slot 398 by the stop finger 415 the ring 397 and shaft 76 stop rotating.

The finger 415 maintains the clutch 232 disengaged until the start of a new sewing operation. If the spring 400 is not retained in compression, it will tend to advance the cam finger 396 again after momentary compression by the interposition of the stop finger 415, and re-engage the clutch 232. An anti-backlash finger 416 is provided to engage an external shoulder 417 on the ring 397 against reverse movement which would otherwise allow the spring 400 to re-engage the clutch, and it is operated cooperatively with the stopping finger 415. Automatic control of the clutch by the fingers 415 and 416 will be further described.

UPPER FEED CAM

A.—Rapid feed

The upper and lower stitching mechanisms 10 and 11 which together with the housing 30, the table 38, the brackets 104, the upper cam housing 102 and the housing 100 form an integral unit, may be moved longitudinally relative to the bed plate 2 rapidly to position them for the start of a sewing operation with respect to work on the work plate 6 and then intermittently for stitching during the sewing operation. For these purposes the table 38 supporting the stitching mechanisms is fed longitudinally over the table 42 on the rollers 40.

The stitching mechanisms 10 and 11 are longitudinally fed rapidly and intermittently slowly by a large upper feed cam 233 which is horizontally mounted rotatably in the upper cam housing 102, Figs. 18, 19, 22, 48 and 49. For rapid longitudinal feed, the upper feed cam 233 is driven by the motor 5 through a worm 240 on the shaft 231 engaging a gear 241 on a shaft 235, Fig. 52, which directly drives the feed cam 233 through an upper cam clutch 243, Figs. 54 and 58. The clutch 243 is engaged automatically as will be described. The gear 241 floats on the shaft 235 and is drivingly connected to it through a pawl and ratchet one-way clutch indicated at 242, Fig. 54, in such a manner that whenever the motor 5 is energized for power drive, the shaft 235 rotates.

The upper clutch 243 has a driving element 510 which is splined to and slidable lengthwise of the shaft 235. The driving element 510 may be engaged with a gear 247 which floats on the shaft 235 and in turn engages external teeth 248 on the cam 233.

B.—Pawl and ratchet clutch

The pawl and ratchet one way clutch 242 is provided to inter-connect the driving gear 241 with the cam drive shaft 235, so that the shaft 235 may be turned by hand operation of the machine without driving the gear 241 against its driving worm 240.

The pawl and ratchet clutch 242, comprises a driving member 490 upon which is mounted a pair of pawls 491 which are pivoted at 492. They engage ratchet teeth 493 on a driven member 494 which is keyed to the shaft 235. Thus when the driving gear 241 is rotated, the pawls 491 engage the teeth 493 to rotate the shaft 235, but the shaft may be rotated free of the gear 241. A pair of springs 496 urge the pawls against the ratchet teeth 493. A cover 498 encases the ratchet mechanism.

C.—Sewing drive control

The upper feed cam 233 engages and disengages the sewing drive clutch 232 by actuating the fingers 415 and 416 to start and stop sewing through a rocker arm 420, Figs. 35 and 48 pivoted at 421 on the upper cam housing 102. At one end thereof the rocker arm 420 has a cam follower 422 extending through a slot 423 in the cam housing 102 which rides in a cam groove 424, in the top of the upper feed cam 233. An extension 425 of the rocker arm 420 is adjustably positioned in a slot 426 on the arm 420 by screws 427. When the varying contour of the cam groove 424 traverses the cam follower 422, the arm 420 is moved about its pivot 421 and its extension 425 engages the lower end 428 of the stopping finger 415 to move it out of engagement with the cam finger 396, Fig. 36, so that the clutch 232 may engage itself and drive the shaft 76 at the start of each new sewing operation.

The stopping finger 415 is pivoted at 429 on an arm 430. The arm 430 is pivoted at 431 in a bearing 432 mounted on the upper cam housing 102 and one end 433 of the arm 430 engages a collar 434 on a stud 435 on the upper cam housing 102. The collar 434 is held downwardly yieldingly by a spring 436 against the end 433 to maintain the pivot end 429 of the arm 430 in a raised position. When the stop finger 415 is allowed by the extension 425 to stop the clutch the spring 436 acts as a cushion to the quick stopping action. The anti-backlash finger 416 is pivoted at 445 on a bearing 446 on the upper cam housing 102 and one end 447 has a cam surface 448 which may be engaged by the extension 425 when the latter throws the stop finger 415 out of engagement with the finger 396 so the clutch may engage itself. When the extension 425 is actuated by the cam groove 424 it wedges against the cam surface 448 to move the end 447 upwardly. When the extension 425 releases the stopping finger 415 to engage the cam finger 396 to disengage the clutch and stop the shaft 76, the inertia of the rotating driven member 391 presses the stopping finger 415 downwardly against an extension 450 of the finger 416 causing the latter to engage the clutch and prevent backlash. The fingers 415 and 416 hold the clutch out of engagement until the beginning of the next sewing operation.

D.—Intermittent feed

During sewing the upper feed cam 233 is rotated intermittently independent of the direct drive shaft 235 for a slow step by step sewing feed at which time it is driven from the sewing drive shaft 76 through a roll clutch generally indicated at 245, Figs. 52, 54 and 55, floating on the shaft 235 but operatively independent of it in a housing 246. At this time the upper clutch 243 is disengaged so that the drive shaft 235 continues to rotate with the motor 5 without affecting intermittent feed. The roll clutch 245 is intermittently actuated by a cam 250 mounted upon the sewing drive shaft 76, Figs. 52, 53. A roll clutch drive arm 251 is longitudinally reciprocated by the cam 250 and its associated parts to drive the feed cam 233 intermittently. A cam follower 252 is engaged by the cam 250 and mounted to reciprocate slidably on a shaft 253 which is journalled on the upper cam housing 102. A rocker arm 254 pivotally mounted at 255 on the upper cam housing 102 transfers reciprocal motion from the cam follower 252 to the drive arm 251 by a pair of steel bands 260 and 261, one of which 260 is connected to the cam follower 252 by a connecting pin 262 and to the rocker arm 254 by an adjustable tension set screw 263, and the other of which 261 is connected to the cam follower 252 by a pin 264 and to the rocker arm 254 by a pin 265. The bands 260 and 261 make surface contact with the rocker arm 254 over an arcuate surface 266 thereon. One end of the roll clutch drive arm 251 is pivotally mounted at 270 adjustably in a slot 271 in the rocker arm 254.

Thus when the sewing drive shaft 76 is rotated a longitudinally reciprocal motion is imparted to the roll clutch drive arm 251.

The roll clutch 245 has a cup-shaped driving member 272 to which the drive arm 251 is connected and which floats on the shaft 235, Figs. 54 and 55. A driven member 273 also floating on the shaft 235 is integral with the driving gear 247 which rotates the upper feed cam 233. Oscillation of the driving member 272 by the drive arm 251 moves the driven member 273 step by step in one direction through engagement between them of driving rolls 274 in the usual manner. A steel band 279 is looped over an external cup-shaped sheave 278 connected to the driven member 273 to prevent overrunning of the latter.

By adjusting the distance between the pivot 270 of the roll clutch drive arm 251 and the pivot 255 of the rocker arm 254, the angular amount which the upper feed cam 233 moves on each stroke of the drive arm 251 may be varied. Hence the amount of traverse of the upper feed cam 233 may be varied for each rotation of the sewing drive shaft 76 which governs stitch length in sewing. This is accomplished by a stitch length handle 281 on the top of the machine, Fig. 23, mounted on a vertical stitch length shaft 282. An arm 283, Fig. 52, fixed on the shaft 282 is operatively connected at 284 to another arm 285 which in turn is pivotally connected to the roll clutch drive arm 251 at 286. When the pivot connection 270 on the drive arm 251 is left loose the arm 251 may slide in the slot 271 in the rocker arm 254 to vary its distance from the pivot 255. Therefore, when the handle 281 is positioned by the operator the stitch length will be varied according to the position of the pivot 270 on the arm 251. A knurled clamping screw 282a is provided on the top of the shaft 282 to keep it from turning when the stitch length handle 281 has been set.

E.—Feed drive linkage

Rotation of the upper feed cam 233 feeds the stitching mechanisms longitudinally through a feed drive arm 287 near the front of the machine Figs. 48, 52, 61 and 64, which drivingly links the cam 233 to the bed plate 2. It is pivotally mounted at 288 on a block 289 which at certain times may slide in an arcuate slot 290 in the upper cam housing 102. The block 289 is held fixedly in the slot 290 by a pin 291 in a hole 297 in the block during longitudinal feed.

The locking pin 291 is inserted in the hole 297 in the block 289 by the upper cam 233, Figs. 49 and 61–63. A cam groove 340 in the lower face of the upper cam 233 actuates a cam follower 341 which is loosely mounted as in a slot 341a upon an arm 342 pivoted at 343 to the upper side of a center plate 344 between the upper and lower cam housings 102 and 103. Attached to the cam follower 341 is an arm 345 sliding in bearings 346 in the center plate 344, and it is operatively connected to a rocker arm 347 at 348. The rocker arm 347 is pivoted at 349 to a pair of bosses 350 on the upper cam housing 102, and actuates the locking pin 291 through a connection 351.

Thus when the contour of the cam groove 340 changes, it will operate the locking pin 291 at the required time in the operative cycle of the machine to hold it against swinging during longitudinal feed and to release it thereafter. When the locking pin 291 is withdrawn from the block 289 the feed drive arm 287 and its associated parts are free to slide in the slots 290 and 336a relative to the upper cam housing 102 when the stitch mechanisms 10 and 11 are swung, as will be described.

The arm 287 is pivotally actuated by the cam 233 and a cam follower 292 secured to it and riding in a cam groove 293 in the upper face of the upper feed cam 233. A connecting drive pin 294, Fig. 52, is mounted in a block 295 which may slide in a slideway 296 in the feed drive arm 287. The drive pin 294 is operatively connected to an adjustably positioned nut 299 on a feed drive structure 300, Fig. 64, which is rigidly connected to the bed plate 2.

When the cam groove 293 traverses the follower 292 when the upper feed cam 233 rotates, the feed drive arm 287 changes the position of the drive pin 294 relative to the movable structure including the upper cam housing 102 and the stitching mechanisms 10 and 11. Because the drive pin 294 is held rigid relative to the bed plate 2 by the nut 299, the stitching mechanisms 10 and 11 are fed longitudinally relative to the bed plate 2 for a feeding operation whose resulting travel for one revolution of the feed cam 233 depends upon the adjusted position of the nut 299. The cam follower 292 passes through a slot 302 in the top of the cam housing 102 so as to clear the housing during its movement. The arm 287 has a pair of flat wings 303 which ride slidably under hold down plates 304 to keep it from capsizing, Fig. 52.

A knurled hand operating wheel 301, Fig. 64, may be turned to adjust the position of the nut 299 on the feed drive structure 300 relative to the bed plate so that the distance of the drive pin 294 from the pivot 288 of the feed drive arm 287 may be varied. This determines buttonhole length and affects stitch length.

Movement of the hand wheel 301 turns a shaft 305 and gear 308 which drives another gear 309 on a threaded shaft 310 rotatably journalled in the structure 300 against endwise movement. The nut 299 travels along the threaded shaft 310 when it is rotated. Another nut 311 travels along a threaded portion 312 of the shaft 305 when it is rotated, and has an indicator arm 313 which is positioned in a slot 314 on the bed plate 2 to show the amount of adjustment for buttonhole length, which may be calibrated in terms of inches.

During longitudinal feed the upper and lower stitching mechanisms 10 and 11 are locked against swinging by an extension 315 of the pivot 288 which rides slidably during longitudinal feed in a slot 316 in the feed drive structure 300, Fig. 64. As long as the pin 291 remains in the hole 297 to maintain the block 289 and pivot 288 rigid relative to the upper cam housing 102, the slot 316 prevents the structure including the upper and lower stitching mechanisms 10 and 11 from swinging relative to the bed plate 2.

The neutral or starting position of the stitching mechanisms 10 and 11 is about midway between the extremes of longitudinal feed. When the machine is started, the upper feed cam 233 is rotated rapidly in direct drive to bring forward the stitching mechanisms 10 and 11 relative to the work plate 6 to position them for sewing. They move by intermittent feed toward the rear of the machine during sewing, then rapidly rearward and thereafter to the neutral position.

F.—Lower stitching mechanism connection

The lower stitching mechanism 11 is lowered after sewing is finished to clear it from the bed plate 2 when it is swung away from under the aperture 14, by the upper feed cam 233 which raises and lowers the arm 216, Figs. 19 and 41. A cam ridge 372, Fig. 49, on the bottom of the upper cam 233 moves a cam follower 373 on a crank 374 attached to a shaft 375. When the shaft is rotated it operates a crank 376, Fig. 19, and a parallelogram linkage 378 which is operatively connected to the arm 216. The cam follower 373 is urged against the cam ridge 372 by springs 379 attached to the parellelogram linkage 378.

LOWER FEED CAM

A.—Pivot feed

After the sewing operation has been completed and the stitching mechanisms 10 and 11 have been returned to the neutral position longitudinally, a lower feed cam 234, Figs. 50 and 51 swings the stitching mechanisms 10 and 11 out of the way of the work for the patch and material slitting and turning operation. For this purpose the upper cam 233 is stopped by disengaging its clutch 243, and the lower feed cam 234 is driven from the shaft 235 by a lower drive clutch 244 which is automatically engaged, Figs. 54 and 59.

The lower clutch 244 comprises a driving element 550 which is splined to and slidable lengthwise of the shaft 235 so that it may engage a lower gear 552 which meshes with external teeth 553 on the lower feed cam 234 to drive the cam 234.

The lower feed cam 234 swings the stitching mechanisms 10 and 11, Figs. 19, 22, and 51, by moving a cam follower 320 riding in a cam groove 322 in its bottom and located at one end of an arm 321 which is fast on a shaft 323. The shaft 323 is journalled in bosses 324 and 325 in the upper and lower cam housings 102 and 103 respectively. On the upper end of the shaft 323 is fixed a swing arm 330 which is connected operatively at its other end to a block 331 which may move in a slideway 332 connected to the bed plate 2.

Thus the lower cam 234 swings the upper and lower stitching mechanisms 10 and 11 and their structure about the pivot 44 during part of its rotation.

For swinging, the pin 291 is withdrawn from the hole 297 in the block 289 so that the block may slide in the arcuate slot 290, Figs. 61–63. At this point also the cam follower 292 is positioned in its groove 293 opposite an arcuate slot 336a which is an extension of the slot 302 in the upper cam housing 102, Figs. 48 and 52. The slots 290 and 336a are both concentric with the pivot 44 of the machine. Therefore, the feed drive arm 287 and its associated mechanism attached to the bed plate 2 may slide arcuately in the slots 290 and 336a relative to the upper cam housing 102 and stitching mechanisms 10 and 11. At this time the cam follower 292 on the arm 287 slides in an arcuate portion of its cam groove 293 in the upper cam 233 which is concentric to the pivot 44 and corresponds to the slot 336a.

During swinging of the upper and lower stitching mechanisms 10 and 11 they are locked so that they cannot move longitudinally relative to the bed plate 2 by a pin 336, Fig. 19, through the table 38 and in a hole 337 in a block 338 attached to the pivot 44. The locking pin 336 is operated to lock the table 38 by a raised ridge 360, Fig. 48, forming a cam surface on the upper feed cam 233 on which rides a vertical rod 361 which moves the pin 336 through rocker arms 363 and 367. When the vertical rod 361 is raised by the ridge 360 at the start of rotation of the upper feed cam, the locking pin 336 is withdrawn from the hole 337 to unlock the table 38 so that the stitching mechanism 10 and 11 may be fed longitudinally.

FEED CAM CLUTCH CONTROL

Automatic transfer of feed cam drive from the upper feed cam 233 to the lower feed cam 234 and back during the operative cycle of the machine by alternative engagement and disengagement of the upper feed cam clutch 243 and the lower feed cam clutch 244, Figs. 54 and 58, is effected by the upper and lower feed cams 233 and 234.

A collar 512 is mounted relatively slidable rotatably in an annular groove 518 on the driving element 510 by which the latter is engaged and disengaged. A control arm 513 is operably connected by a yoke 517 to the collar 512 to engage the driving element 510 with the gear 247. The control arm 513 is pivoted at 515 in a boss 516 on the center plate 344.

A cam groove 520, Figs. 49 and 58, in the lower side of the upper feed cam 233 has a cam surface 521 whose varying contour controls the arm 513 as the cam 233 rotates to disengage the clutch 243 during sewing and to allow it to re-engage thereafter. See Figs. 57 and 58. A bearing surface 522 on the upper portion of the arm 513 rides against the cam surface 521.

A trip latch 523 mounted pivotally at 524 on the center plate 344 has a surface 525 which abuts against a surface 526 on the control arm 513 to hold the clutch 243 disengaged except during direct drive feed before and after intermittent sewing feed. The driving element 510 is urged upwardly into engagement by a spring 530 pressing against an extension 531 of the collar 512.

When the clutch 243 has been disengaged by the cam surface 521 a spring 533 between the center plate 344 and the trip latch 523 engages the latch 523 against the surface 526 to maintain the clutch 243 disengaged. A trip cam 534 mounted on the underside of the feed cam 233 engages the end 535 of the latch 523 to throw its surface 525 clear of the arm 513 and allow the clutch 243 to re-engage to feed the stitching mechanisms 10 and 11 back to neutral position after sewing from which point they are swung by the lower cam 234.

The operative cycle of the machine is started by hand through an arm 536 operatively connected to the latch 523 to engage the clutch 243. The arm 536 is operatively connected to an arm 537, Fig. 57, which is pivoted on the center plate 344 at 538.

The arm 537 is urged counter-clockwise as seen in Fig. 57 by a spring 539 connected to the center plate 344. A crank arm 545 is fixed on a vertical hand-operating shaft 546 and connected to rotate the arm 537. The shaft 546 is journalled in an extension 548 of the center plate 344 and extends upwardly through the table 308, Fig. 23. A starting handle 547 on the end of the shaft 546 throws the latch 523 to start longitudinal direct drive feed.

The lower clutch 244 is engaged and disengaged by a collar 555 mounted slidably in a slot 554 on the driving element 550 for engaging and disengaging it, and which has an extension 556 supporting the lower end of the spring 530. The spring 530 thus urges both clutches 243 and 244 into engagement. A control arm 560 is operatively connected to the collar 555 by a yoke 563. It is rotatably mounted at 561 on a boss 562 on the underside of the center plate 344. A cam groove 565 on the underside of the upper cam has a cam surface 566 whose contour controls the control arm 560 to disengage the clutch 244 and to allow it to engage, Figs. 49 and 58. The arm 560 has a bearing surface 567 at its upper end which rides against the cam surface 566. When the upper feed cam 233 is rotating, the cam surface 566 holds the lower clutch 244 disengaged and when the drive is shifted from the upper cam 233 to the lower cam 234, the surface 566 provides relief 568, Fig. 49, to allow the lower clutch 244 to engage to drive the lower cam 234. Rotation of the lower cam 234 disengages the upper clutch 243 and stops the upper cam 233. An arm 569 pivoted at 561 rides on the upper face of the lower cam 234 at 573 and is operatively connected to the arm 513 at 574 to hold it downward in disengaged position whenever the lower cam 234 is rotating. However, when the lower cam 234 is in neutral during rotation of the upper cam 233, a depression 580, Fig. 60, is positioned under the end 573 of the arm 569 so that the upper clutch 243 can engage and disengage. Therefore, when drive is shifted to the lower cam 234 and as soon as the latter starts to rotate, the depression 580 moves out from under the end 573 of the arm 569 which rocks to disengage the upper clutch 243 and stop the upper cam 233. The lower cam then operates to perform its function until it is disengaged by an inclined slidable stop cam 570, Fig. 59, on top of the lower cam which is loaded by a spring 571 to lie advanced in the slideway 572 in the direction of cam rotation.

At the end of the lower cam 234 rotation, the stop cam 570 engages a follower 575 on the end of an arm 576 pivoted at 577 in a bearing 578 under the center plate 344. Engagement of the follower 575 moves the stop cam 570 to the rear of its slideway 572 where it is stopped relative to the cam 234 and moves under the follower 575 to raise it. When the follower 575 is raised by the entrance under it of the stop cam 570, the arm 576 raises the control arm 560 to disengage the lower clutch 244 and stops the lower cam 234. The lower clutch 244 is held disengaged by the stop cam 570 which remains under it until after a new cycle is started by the operator.

When the starting handle 547 is again operated to throw the latch 523 and restart the machine, a projection 579, Fig. 49, on the cam surface 566 throws the bearing surface 567 of the arm 560 sharply to the right. This relieves downward pressure on the cam follower 575 which was sitting on the cam stop 570 and allows the latter to snap back into its advance position in its slideway 572 and out from under the cam follower 575, so that the control arm 560 may be moved to engage the lower clutch 244 when drive is later shifted to the lower cam 234.

The upper and lower feed cam clutches 243 and 244 are operated in sequence as follows:

The machine is at rest in its neutral position in which the stitching mechanisms 10 and 11 are approximately midway between the extremes of longitudinal feed, from which point they are swung following sewing and finally come to rest at the end of an operative cycle. Both clutches 243 and 244 are disengaged. The motor 5 is energized and the cam drive shaft 235 rotates. The starting handle 547 is moved to throw the trip latch 523, Fig. 58, which allows the upper clutch 243 to engage by raising the driving element 510, under the pressure of the spring 530. As soon as the upper cam 233 starts rotating, the projection 579 on the cam surface 566 momentarily lifts the control arm 560 of the lower clutch to allow the stop cam 570 to snap out from under it so that the lower clutch 244 may be later engaged. The upper cam 233 rotates under direct drive for forward rapid longitudinal feed of the stitching elements 10 and 11 until they are positioned to commence a sewing operation. At that point the cam surface 521 disconnects the upper cam 233 from direct drive by disengaging the upper clutch 243, but the upper cam 233 continues to rotate intermittently through the step by step intermittent feed drive previously described for sewing. The latch 523 locks out the upper clutch 243.

At the end of sewing, just as intermittent feed ceases, the trip cam 534 trips the latch 523 and allows the upper clutch 243 to engage again to feed the stitching mechanisms 10 and 11 to the neutral position at which they are locked longitudinally and swung out of the way. The relief 568 in the cam surface 566 allows the lower clutch control arm 560 to engage the lower clutch 244, and the lower cam 234 starts rotating. The depression 580 moves out from under the end 573 of the arm 569 to rock it and disengage the upper clutch 243 which stops the upper cam 233. The upper clutch 243 is held disengaged during an entire revolution of the lower cam and until it stops with the depression 580 again under the end 573 of the arm 569. The lower cam 234 rotates to swing the machine as previously described and for the subsequent operations, and at the end of its rotation the stop cam 570 engages the follower 575 which raises and disengages the clutch 244. While the upper cam 233 was rotating and after the stop cam 570 was disengaged, the surface 566 held the arm 560 in such position that the lower clutch 244 was disengaged until neutral position was again reached.

Rotation of the upper feed cam 233, therefore, transfers drive to the lower feed cam 234, which in turn, stops the upper feed cam 233 and later stops itself at the end of operation. The machine automatically stops in an automatic cycle which must be restarted by the operator for making each new piped buttonhole.

WORK CLAMP DETAIL AND LINKAGE

The work clamp 7, Figs. 12, 13, 14, 23, 24 and 25, is a horse-shoe shaped member for holding down the base material A on the work plate 6 and it is pivotally connected at 600 and 601 to a pair of arms 602 and 603 which are journalled at 604 and 605 on the bed plate 2. They are spring urged downwardly against the work plate 6 to hold material thereon. The work clamp 7 may be raised to insert base material A thereunder by an arm 608 on a shaft 609 operatively connected to the arms 602 at 610. The arm 608 is operated by a rod 611 from below the machine by the operator's foot and a suitable foot pedal (not shown). Figs. 25 and 66–68 show the interconnection of the arm 608 with the presser arms 602 and 603. The arm 608 is integrally connected to the shaft 609 which is journalled in bearings 612 and 613 under the bed plate 2. A pair of arms 620 and 621 are integrally mounted on the shaft 609 and connect respectively with the arms 602 and 603 through pins 622 and 623. A compression spring 625 interposed between the end of the arm 608 and a bracket 626 under the bed plate 2 urges the arm 608 upwardly so that the work clamp 7 is pressed down against the work plate 6. The work clamp 7 is urged normally down against the work plate 6. The work clamp 7 is urged normally down against the work plate 6 unless it is raised by the operator's foot through the rod 611.

CENTER BLADE DETAIL AND LINKAGE

The center blade 8, Figs. 12, 13, 14, 24, 25, and 64, which holds down the patch B and over which the edges of the patch B are folded, is raised by the operator for positioning the patch and it travels longitudinally relative to the work plate 6 over the aperture 14 therein cooperatively with the stitching mechanisms 10 and 11 as they are intermittently fed during sewing. During the operations which follow sewing, it is removed entirely from the way of the aperture 14 and later returned to its starting position for a new sewing operation. As seen in Fig. 25 the center blade 8 is attached to a crooked arm 630 which is pivoted at 631 in a block 632 which slides in a slideway 633, Fig. 66, under the work plate 6. The arm 630 has a lower extension 634 by which it is moved longitudinally in the direction of feed during a sewing operation and by which also the center blade 8 is raised for positioning a patch.

The extension 634 is engaged by a spring loaded latch 635, Figs. 64 and 65, to feed the center blade 8 cooperatively with the stitching mechanisms 10 and 11 when they are intermittently fed.

The center blade 8 has two outside end slits 636 and 637, Fig. 24, through which the needles 32 pass from above as they sew, and a center end slit 638 through which the slit cutter 21 passes from below the material A and patch B to cut buttonhole slits therein. During sewing and slit cutting the center blade 8 is fed intermittently with the stitching mechanisms 10 and 11 so that these slits are always positioned to receive the needles and cutter through them. The latch 635 is pivoted at 640 on a bracket 641 which is mounted on the journal 75 supporting the sewing drive shaft 76, Figs. 64 and 65. The latch 635 is urged upwardly to engage the extension 634 by a spring 642. When the stitching mechanisms 10 and 11 are intermittently fed during sewing, the latch 635 engages the lower extension 634 of the block 632 and moves the center blade 8 rearwardly with the stitching mechanisms or to the left as seen in Fig. 25. When the center blade 8 is in its position to commence sewing, the lower extension 634 is to the right so that a lower extension 645 of the arm 630 which forms a cam follower surface is in engagement with and over a cam 646 which is attached to a sleeve 647, Figs. 66–68, on the shaft 689 and whose purpose is to raise the center blade 8 to position a patch B thereunder. The sleeve 647 is integrally attached to a sleeve 648 by a bridge member 649 which circumvents the arm 620 and the bearing 613. Attached to the sleeve 648 is an arm 650 for rotating the cam 646 to raise the center blade 8. The arm 650 is depressed to raise the center blade 8 by a suitable pedal (not shown) attached to a rod 655, Fig. 68a, and it is urged upwardly to hold it clear of the center blade extension 645 by a spring 656 between the end of the arm 650 and a bracket 657.

The center blade 8 is held down against the patch B by a spring 660 attached to an extension 661 of the sliding block 632 one end of which urges against the extension 645. A pair of springs 665 and 666, Fig. 66, attached to the extension 661 of the block 632 are secured to the bed plate 2 and arranged to return the center plate 8 to the right as seen in Fig. 25 to its starting position over the aperture 14 for a sewing operation. A ratchet 670 on the block 632, Figs. 64 and 66, is engaged by a spring loaded pawl 671 attached to the bed plate 2 and pivotally mounted at 672. The pawl 671 tends to keep the center blade 8 from overrunning during intermittent feed and holds it at whatever position it has reached during feed against the springs 665 and 666 until the pawl 671 is released.

Upon completion of the sewing operation, the center blade 8 still extends over the aperture 14 and it must be completely removed therefrom for the operations following sewing. For this purpose, a cam 675 mounted upon the bracket 641, Figs. 64 and 65, is adapted to engage the lower extension 634 of the block 632 and move the center blade 8 completely back away from the aperture 14 to the left as viewed in Fig. 25 when the stitching mechanisms 10 and 11 are swung away after sewing. As seen in Figs. 64 and 65 when the cam 675 attached to the bracket 641 is swung to the right to engage the extension 634 of the block 632, the block will be wedged and moved towards the rear of the machine to clear the center blade 8 from the aperture 14. It remains in the rearward position until the stitching mechanisms 10 and 11 are again swung back into neutral position at which time a spring clip 680, Fig. 64, engages the pawl 671, to release the ratchet 670 and allow the center blade 8 and its associated mechanism to spring back towards the front of the machine for a new sewing operation, to the right as viewed in Fig. 25. The pawl 671 is held engaged to the ratchet 670 by a spring 673. The cam 675 is adjustably mounted on the side of the bracket 641 so that it may be placed in a position to engage the extension 634 when the machine is swung.

The operation of the center blade 8 is as follows:

Beginning with its starting position to the right, Fig. 25, the lower extension 645 of its arm 630 is engaged by the cam 646. The operator presses a foot pedal attached to the arm 650, Fig. 66, raises the cam 646 and the center blade 8. A patch B is placed thereunder and the operator's foot is released so that the center blade 8 presses the patch B down against base material A which has been positioned under the work clamp 7. The sewing operation is commenced and the stitching mechanisms 10 and 11 feed intermittently to the left. The latch 635 engages the lower extension 634 of the block 632, Figs. 64 and 65, and the center blade 8 is intermittently moved with the stitching mechanisms 10 and 11. When the sewing of the buttonhole is completed the stitching mechanisms 10 and 11 are returned to their neutral position and swung away from the aperture 14. The cam 675 on the bracket 641 swings with the upper cam housing 102 and engages the extension 634 to move the center blade 8 further back away from the aperture 14 to clear it. As the stitching mechanisms 10 and 11 are again moved back over the aperture 14, the clip 680 engages the pawl 671 to release it from the ratchet 670 and the center blade 8 springs back into its original position to the right under the force of the springs 665 and 666 ready for a new operative cycle.

PATCH FOLDERS, DETAIL AND LINKAGE

The patch folders 9, Figs. 12, 13, 14, 18, 19, 24, 25 and 37, are adapted to move together over the center blade 8 to fold the edges of a patch B over it as heretofore described. The folders 9 comprise a pair of brushes 690 and 691 which are bolted at 692 and 693 to arms 694 and 695 which are in turn bolted at 700 and 701 to a pair of sliding blocks 702 and 703 which may slide toward and away from each other in a slideway 705 in a cross beam 706, Figs. 37–40. The cross beam 706 is oscillatably journalled in a pair of brackets 708 and 709 which are mounted on top of the bed plate 2, and rotatably urged by springs 710 and 711 in such direction that the brushes 690 and 691 of the folders 9 tend to press downwardly against the material A placed under them.

The blocks 702 and 703 are normally spread by springs 715 and 716 between the cross beam 706 and the blocks 702 and 703 respectively. A pair of cam surfaces 725 and 726 on upward extensions of the blocks 702 and 703, respectively, are engaged by camming pins 727 and 728 which are slidably mounted in the upper stitching mechanism housing 30, see Fig. 19 and Fig. 37, to cause the patch folders 9 to come together over the center blade 8 to fold a patch B thereover, when the camming pins 727 and 728 are moved downwardly.

The pins 727 and 728 are actuated downwardly by the upper cam 233 at the beginning of the operative cycle. An arm 730, Fig. 19, pivotally mounted in the housing 30 at 731 is operatively engaged in slots 732 in the pins 727 and 728 and by an abutting slidable rod 735 under one end thereof supported in the housing 30 and table 38. The rod 735 is moved by the end 362 of the arm 363 abutting against a collar 737 on the rod 735, when the arm 363 is rocked by the rod 361 which rides on the ridge 369 on the top of the upper cam 233, Fig. 48, as previously described.

This motion of the arm 730 also actuates the arm 88 to release the thread clamp 79, Figs. 18 and 18a, as heretofore described.

When the stitching mechanisms 10 and 11 are in the neutral feed position at the beginning of the operative cycle of the machine, the pins 727 and 728 which close the patch folders 9 are positioned over the cam surfaces 725 and 726 ready to engage them. When the patch folders 9 have been closed, they are locked in a closed position against the springs 715 and 716 by a locking mechanism 740 on the bottom of the cross beam 706 which is pivoted at 741 and urged upwardly by a spring 742 to cause its projections 743 and 744 to engage in slots 745 and 746 in the bottoms of the blocks 702 and 703 respectively to hold them together. The patch folders 9 remain together to hold the patch B folded over the center blade 8 during sewing but thereafter they are no longer needed and must be spread again to clear the aperture 14 for subsequent operations. An extension 750, Figs. 25 and 37-39, on the locking lever 740 is disposed to be engaged by the bottom of the casing 30 when the stitching mechanisms 10 and 11 are swung which rocks the locking lever 740 and withdraws the projections 743 and 744 from the slots 745 and 746 so that the patch folders 9 may spread after sewing. The patch folders 9 remain spread until the beginning of a new cycle when another patch B is positioned and folded as described.

PATCH TURNERS AND TAB SLIT CUTTERS, DETAIL AND LINKAGE

The patch turners 12 and tab slit cutters 13, Figs. 15, 16, 17, 26, 31 and 52, are mounted on an extension 810 attached to the upper cam housing 102 and also to the housing 100 which supports the lower stitching mechanism 11. The patch turners 12 and cutters 13 are actuated by the lower feed cam 234. They are normally offset below and to one side of the aperture 14 except when in operative position, and they are positioned directly under the aperture 14 to pass up through it when the stitching mechanisms 10 and 11 are swung away. When the patch turners 12 and tab slit cutters 13 are operating, the table 38 supporting the stitching mechanisms 10 and 11 and associated structures is in the position indicated by the dotted outline in Fig. 23. The turners 12 and cutters 13, Figs. 26-29, are mounted upon a pair of uprights 811 which are bolted in a horizontally adjustable manner to a pair of blocks 812 and 813. The blocks 812 and 813 are horizontally slidable in relatively opposite directions on the top of a cross-head 816 which in turn is vertically slidable. The block 812 is attached to a slide 820 and the block 813 is attached to a slide 821, both of which are slidable in slideways 815. The blocks 812 and 813 are driven in relatively opposite directions simultaneously by a pinion 823 engaging the racks 824 and 825. The pinion 823 is fast upon a stub shaft 828 in the cross head 816 and at the lower end of which is a gear 829 engaged by a gear 832 which, in turn, is connected by a link 833 to a drive crank 834 which is splined to and slidable vertically on a splined shaft 835 journalled in the support 810. On the bottom of the splined shaft 835 is fixedly mounted to drive it a gear 840 which is engaged by the toothed sector 841 of a crank 842 which is pivotally mounted at 843 Fig. 50. The crank 842 is actuated to spread the patch turners 12 and cutters 13 through a link 845 connected to a cam crank 846 pivotally mounted at 847 in the bottom of the center plate 344 over the lower feed cam 234, Fig. 50. The cam crank 846 has at one end a cam follower 850 engaged in a cam groove 851 in the upper face of the lower cam 234 so that rotation of the lower cam 234 and the changing contour of the cam groove 851 as it traverses the cam follower 850 spreads and closes the patch turners 12 and tab slit cutters 13.

The cross head 816 supporting the turners 12 and cutters 13 is raised and lowered in slideways 860 on a pair of vertical supports 861. Its lowered position is shown in Fig. 26 and its raised position in Fig. 27. A lower extension 863 of the cross head 816 is connected with the lower feed cam 234 through a pivotal link 865, a crank 866 connected thereto and fixed on a gear 867 which is driven by a crank 868 connected to its center 882 and in turn fixed to a gear 869 rotatably mounted in the center of a housing 870. The gear 869 is rotated by a rack 872 connected by a link 873 to a cam crank 874 which is pivoted at 875 on the under side of the center plate 344 over the lower cam 234, Fig. 50. The cam crank 874 is actuated by a cam follower 880 thereon travelling in and moved by a cam groove 881 on the upper side of the lower cam 234.

When the lower feed cam 234 is rotating, the varying contour of the cam groove 881 rotates the cam crank 874 and moves the link 873 and rack 872 longitudinally. The rack 872 rotates the gear 869 and turns the crank 868 to move the center 882 of the gear 867 circumferentially about the center of the gear 869. Internal teeth 885 inside the housing 870 engage the gear 867 and rotate it which pivots the crank 866. Its end 884 moves nearly vertically to raise and lower the cross head 816 and the finger 12 and cutters 13 thereon. The contours of the cam grooves 851 and 881, Fig. 50, are disposed so that as the lower feed cam 234 rotates while the patch turner 12 and cutters 13 are in operative position, they perform the operations as heretofore described.

PRESSERS, DETAIL AND LINKAGE

The upper presser 15, Figs. 17, 18, 19, 23, 69, 70 and 72, is pivotally mounted at 900, Fig. 18, on an upper presser arm 901 which is pivoted at 902 on the housing 30, Fig. 69. It is normally held upwardly out of the way by spring 903 between the table 38 and the arm 901, Fig. 70. It is operated by the rotation of the lower feed cam 234, Figs. 51, 69 and 70, by a rod 905, a rocker arm 906 operatively connected thereto, and pivoted at 907, the flat surface 910 of a cam 910a on a shaft sleeve 911, engaging a roller 912 on the end of the arm 906 to rock it, a crank 915 on the shaft sleeve 911 and a turn buckle link 916 which is adjustable in length and connected to a cam rocker arm 920 under the lower feed cam 234 and pivoted at 921 on the lower cam housing 103. The cam rocker arm 920 is actuated by a ridge 925 on the bottom of the lower feed cam 234 upon which rides a cam follower 926 on the arm 920. Thus when the lower feed cam 234 rotates, the ridge 925 traverses the cam follower 926 at the beginning of the pressing operation which rocks the arm 920 down to lower the link 916 and crank 915 and rotate the shaft sleeve 911 and the cam 910a clockwise under the roller 912. The roller 912 raises upon the cam surface 910, rocks the arm 906 clockwise, and lowers the rod 905 which brings the upper presser arm 901 and presser 15 downwardly to press the top of the material A and patch B.

The lower presser 16, Figs. 17, 51, 69, 71 and 72 is operated also by the lower feed cam 234 cooperatively with the upper presser 15 so that the patch A and material B are firmly pressed between the two pressers 15 and 16. The lower presser 16 contains a suitable heating element 939 to facilitate the pressing operation and it may preferably be in the form of an electric heating coil connected flexibly to an electric source.

The mechanism for operating the lower presser 16 is a support 931 forming part of a parallelogram linkage which has two pairs of pivotal members 932 and 933 pivoted on an extension 935 attached to the upper cam housing 102 and the lower cam housing 103. The arms 932 have slotted extensions 936 which are engaged by a crank 937 on a shaft 938 rotatably mounted within the sleeve shaft 911, both of which are journalled on the brackets 104 and 935 respectively. The shaft 938 is operatively rotated by a crank 940 which is fast thereon, and a turn buckle link 945 which is adjustable in length, connected between the arm 940 and a cam rocker arm 946 journalled under the lower cam housing 103 alongside the arm 920 at 921. A cam ridge 950 on the bottom of the lower cam 234 engages a cam follower 951 on the arm 946 and rocks it. When the cam ridge 940 traverses the cam follower 951, the lower presser 16 is raised on the parallelogram mechanism comprising the members 931, 932, 933 and 935 upwardly and to the right just under the material A and the patch B to press the latter against the upper presser 15.

HAND OPERATION

Hand operating means are provided to turn the machine over at any stage of its operative cycle. A hand wheel 483, Figs. 18, 22 and 23, is mounted on a shaft 484 which is journalled on the table 38 and upon which is mounted a bevel gear 485 which engages the gear 482 to drive the shaft 235 and arranged so that the gear 485 may be disengaged from the gear 482 during power drive, as by mounting the shaft 484 in a rotatably, eccentric bushing. A gear 950, Fig. 52, is keyed to the shaft 235 near its upper end just under the table 38 clear of the bed plate 2. It engages a gear 951 rotatably journalled on the housing 246 enclosing the roll clutch 245 which, in turn, engages a drive gear 952 also journalled on the housing 246 which, in turn, engages a ring gear 953 on the driving sheave 390 of the sewing drive clutch 232. Rotation of the hand wheel 483, therefore, drives the stitching mechanisms and causes intermittent feed in the normal manner. The interconnecting gear 952 is mounted on a stub-shaft 954 so that it may be raised and disengaged from the gears 951 and 953 for rapid longitudinal feed subsequent to sewing.

After sewing, in hand operation, the upper cam clutch 243 is automatically engaged as previously described. When the clutch 243 is engaged, a throw-out arm 960, Figs. 22, 52, 57 and 58, one end of which rides on the collar 512 of the driving element 510 in the clutch 243 is raised to disengage the gear 952 to which it is interconnected. The arm 960 is pivoted at 961 and connected by a link 962 to an arm 963 pivoted at 966 above it which in turn is engaged with a groove 964 in the gear 952 to raise and disengage it. The arm 963 may also be operated to engage or disengage the gear 952 by a hand latch 965 attached thereto, Figs. 18, 22, 23 and 52, which extends through the top of the table 38. A lock latch 967, is arranged to keep the latch 965 and gear 952 in the engaged position.

OPERATION

The operation of the machine of the invention is as follows:

The operator raises the work clamp 7. Base material A is placed under it on the work plate 6 and positioned with respect to the aperture 14 to form a piped buttonhole in the desired location. The operator releases the work clamp 7 upon the base material A. The operator then raises the center blade 8 and positions a patch B thereunder above the base material A so that it lies on top of the patch folders 9. He releases the center blade 8 which then presses the patch B firmly down against the material. The automatic operative cycle of the machine is now ready to start. The operator starts the motor 5 and throws the starting handle 547. The upper feed cam 233 rotates and the stitching mechanisms 10 and 11 move forward from their neutral position to the sewing position. When the upper feed cam 233 first moves, it raises the rod 361 and lowers the pins 727 and 728 to bring the patch folders 9 together to fold the patch B. The folders 9 remain closed until they are again opened by the swinging of the stitching mechanisms 10 and 11. The sewing drive clutch 232 is automatically engaged and sewing and then straight slit cutting commence. After sewing and straight slit cutting, longitudinal feed is transferred from slow intermittent feed to rapid direct feed, the stitching mechanisms 10 and 11 continue toward the back of the machine to the full extent and then return to neutral position. The feed cam drive is shifted automatically from the upper cam 233 to the lower cam 234. The table 38 is locked against longitudinal feed and thereupon the stitching mechanisms 10 and 11 are swung pivotally away from the work plate 6 and aperture 14. During swinging, the patch folders 9 are released so that they open, the center blade 8 is fully retracted from the aperture 14 and the patch turners 12 and tab slit cutters 13 are brought into operative position under the aperture 14. As the lower feed cam 234 continues to turn, the cutters 13 cut the tab slits H and I, and the patch turners 12 perform the patch turning operations and spread and hold the ends of the patch B for pressing. Then the upper and lower pressers 15 and 16 are actuated to come together at the aperture 14 and press the piped buttonhole which has been formed. The pressers 15 and 16 are returned to their original positions, the stitching mechanisms 10 and 11 are swung back over the aperture 14 into neutral position and the machine is unlocked against longitudinal feed. The base material A with the piped buttonhole formed therein may thereupon be removed from the machine.

We claim:

1. A machine for forming piped holes in flat base material comprising stitching mechanism which sews a folded piping patch on the flat base material, a cutter piercing said material and patch and thereby forming registering slits therein, a patch turner movable through said registering slits and bringing a substantial portion of the patch through the slit in the base material to the side of the base material opposite to that on which the patch was originally located and operating mechanism for said stitching mechanism cutter and patch turner actuating said parts in predetermined timed relation with respect to each other during the operative cycle of the machine.

2. A machine for forming piped holes in flat base material comprising a folder which moves a free portion of a piping patch placed on the said flat base material toward the center of the patch and forms a fold therein, stitching mechanism which sews the fold to the said base material, a cutter piercing said material and patch and thereby forming registering slits therein, a patch turner movable through said slits and bringing a substantial portion of the patch through the slit in the base material to the side of the base material opposite to that on which the patch was originally located and operating mechanism for said folder, stitching mechanism, cutter and patch turner actuating said parts in predetermined timed relation with respect to each other during the operative cycle of the machine.

3. A machine for forming piped holes in flat base material comprising stitching mechanism which sews a folded piping patch on the flat base material, a cutter piercing said material and patch and thereby forming registering slits therein, a patch turner movable through said registering slits and bringing a substantial portion of the patch through said slits to the side of the base material opposite to that on which the patch was originally located, means which press said patch and operating mechanism for said stitching mechanism, cutter, patch turner and pressing means actuating said parts in predetermined timed relation with respect to each other during the operative cycle of the machine.

4. A machine for forming piped holes in flat base material to which a patch has been secured leaving free edges comprising in combination a folder which moves said free edges of the patch toward the center of the patch, a cutter piercing said flat base material and patch and thereby forming registering slits therein, a patch turner movable through said registering slits and bringing a substantial portion of the patch through the slit in the base material to the side of the base material opposite to that on which the patch was originally located and operating mechanism for said folder cutter and patch turner actuating said parts in predetermined timed relation with respect to each other during the operative cycle of the machine.

5. A machine for forming piped holes in flat base material, comprising in combination means which attach a portion of a piping patch to said flat base material, a folder which moves free portions of the patch toward the center of the patch, a cutter piercing said material and patch and thereby forming registering slits therein, a patch turner movable through said registering slits and bringing a substantial portion of the patch through the slit in the base material to the side of the base material opposite to that on which the patch was originally located and operating mechanism for said attaching means, folder, cutter and patch turner actuating said parts in predetermined timed relation with respect to each other during the operative cycle of the machine.

6. A machine for forming piped holes in a flat base material, having in combination stitching mechanism which sews a folded piping patch on the said flat base material, a cutter piercing said material and patch and thereby forming registering slits therein, a patch turner movable through said registering slits and bringing a substantial portion of the patch and some of the base material through the slit in the base material to the side of the base material opposite to that on which the patch was originally located, means which press the patch and the turned portion of the base material against said base material and operating mechanism for said stitching mechanism, cutter, patch turner and pressing means actuating said parts in predetermined timed relation with respect to each other during the operative cycle of the machine.

7. A machine for forming piped holes in flat base material comprising a work clamp which holds the base material, a folder which moves portions of a piping patch placed in the base material toward the center of said patch leaving folds therein, stitching mechanism which sews said folds to the flat base material, a cutter piercing said material and patch and thereby forming registering straight slits therein, additional cutting means which cut diverging tab slits at the ends of said registering straight slits, a patch turner movable through said registering straight slits and bringing a substantial portion of the patch through the slit in the base material to the side of the base material opposite to that on which the patch was originally located and operating mechanism for said work clamp folder stitching mechanism cutter mechanisms and patch turner actuating said parts in predetermined timed relation with respect to each other during the operative cycle of the machine.

8. A machine for forming piped holes in flat base material comprising a folder which moves free portions of a piping patch toward the center of said patch thereby forming folds therein, stitching mechanism which sews the said folds of the patch to the flat base material, a cutter piercing said material and patch and thereby forming registering straight slits therein, additional cutting mechanism which cuts diverging tab slits at an end of said straight slits, a patch turner movable through said registering slits to bring a substantial portion of the patch through the slit in the base material to the side of the base material opposite to that on which the patch was originally located and operating mechanism for said folder, stitching mechanism, cutter mechanisms and patch turner actuating said parts in predetermined timed relation with respect to each other during the operative cycle of the machine.

9. A machine for forming piped holes in flat base material on which a piping patch has been placed comprising a folder which moves free portions of the piping patch toward the center thereof thereby forming two folded edges on the piping patch, a cutter piercing said material and patch and thereby forming registering slits therein, stitching mechanism movable lengthwise relatively to the slits and sewing said folded edges of the patch to said material with two lines of stitches, a patch turner movable through said registering slits and bringing a substantial portion of the patch through the slit in the base material to the side of the base material opposite to that on which the patch was originally located and operating mechanism for said folder, cutter, stitching mechanism and patch turner actuating said parts in predetermined timed relation with respect to each other during the operative cycle of the machine.

10. A machine for forming piped holes in flat base material comprising stitching mechanism which sews at least two lines of stitches through said flat base material and a piping patch thereon, one of said lines of stitches being parallel with and adjacent each side of the location of the button hole to be produced, a cooperating cutter actuated progressively by said stitching mechanism during a part of its operation and piercing said material and patch and thereby forming registering slits therein between said lines of stitches, a patch turner movable through said registering slits and bringing a substantial portion of the patch through the slit in the base material to the side of the base material opposite to that on which the patch was originally located and operating mechanism for said stitching mechanism, cutter and patch turner actuating said parts in predetermined timed relation with respect to each other during the operative cycle of the machine.

11. A machine for forming piped holes in flat base material comprising in combination stitching mechanism and a work clamp movable relatively to each other to sew lines of stitches through said flat base material and a piping patch placed thereon, at least one of said lines of stitches being parallel with and adjacent each side of the location of the hole to be produced, a cutter piercing said material and patch and thereby forming registering slits therein between the lines of stitching and operating mechanism for said stitching mechanism, and cutter moving the stitching mechanism relatively to the work clamp and actuating said parts in predetermined timed relation with respect to each other during the operative cycle of the machine.

12. A machine for forming piped holes in flat base material comprising in combination stitching mechanism and a work clamp movable relatively to each other to sew two lines of stitches through said flat base material and a piping patch placed thereon, each of said lines of stitches being parallel with and adjacent a side of the location of the hole to be produced, a cutter piercing said material and patch and thereby forming registering slits therein between the lines of stitches, a patch turner movable through said registering slits and bringing a substantial portion of the patch through the slit in the base material to the side of the base material opposite to that on which the patch was originally located and operating mechanism for said stitching mechanism, work clamp, cutter and patch turner actuating said parts in predetermined timed relation with respect to each other during the operative cycle of the machine, said stitching mechanism being movable relatively to the work clamp to a position out of the way of the mechanism operating on the work after the stitching is completed.

13. A machine for forming piped holes in base material comprising a work clamp to hold the base material, a center blade which presses a part of a piping patch against the base material, a folder which moves portions of the piping patch toward the center of the patch, stitching mechanism including a needle to sew said folded patch to the base material, a cutter to cut registering straight slits in the base material and patch, and a patch turner movable through said slits to bring said patch through said slit to the side of the base material opposite to that on which the patch was originally located.

14. In a machine for forming piped holes in base material, the combination as set forth in claim 13 in which the center blade is notched to allow passage of the needle.

15. In a machine for forming piped holes in base material, the combination as set forth in claim 13 in which the center blade is movable lengthwise of the slits as the stitching mechanism progresses along the buttonhole location to sew said folded patch to the base material.

16. A machine for forming piped holes in base material comprising a work clamp to hold the base material, a center blade which presses a part of a piping patch against the base material, a folder which moves free edges of the piping patch toward the center of the patch, stitching mechanism including a needle to sew said folded patch to the base material, a cutter to cut registering straight slits in the base material and patch, and a patch turner movable through said slits to bring said patch through said slits to the side of the base material opposite to that on which the patch was originally located, said center blade being movable lengthwise of the buttonhole out from between the folded edges of the patch.

17. A machine for forming piped holes in base material comprising a work clamp to hold the base material, a center blade which presses a part of a piping patch against the base material, a folder which moves free portions of the piping patch toward the center of the patch, stitching mechanism to sew the folded patch to the base material, a cutter to cut registering straight slits in the base material and patch, and patch turners movable through said slits to bring the patch through said slits to the side of the base material opposite to that on which the patch was originally located, said patch turners being movable relatively to the slit after passing therethrough to bend portions of the patch and base material outwardly from the buttonhole to a position parallel with the face of the base material.

18. In a machine for forming piped holes in base material, the combination as set forth in claim 17 and a tab cutter to cut slits at an angle to the straight slits in the base material and patch which connect with said straight slits at their ends.

19. In a machine for forming piped holes in base material, the combination as set forth in claim 17 and tab cutters to cut slits at an angle to the straight slits in the base material and patch which connect with said straight slits at their ends, and which are mounted on and movable with the patch turners.

20. A machine for forming piped holes in flat base material comprising in combination stitching mechanism and a work clamp movable relatively to each other, means which support the flat base material and a piping patch on the base material at the location of the piped hole to be formed, a center blade which presses and holds a longitudinally substantially central portion of the piping patch against the base material and a folder which moves free edges of the patch toward the center of the patch forming two folded edges on said patch each of said folded edges being parallel to the piped hole to be formed, said stitching mechanism being provided with means which sew simultaneously at least two parallel lines of stitches through said material and the said folded edges of the patch, said lines of stitches being parallel with and adjacent the piped hole to be formed and operating means for said stitching mechanism work clamp and center blade and folder actuating said parts in predetermined timed relation with respect to each other during the operative cycle of the machine.

21. A machine for forming piped holes in flat base material comprising stitching mechanism and a work clamp movable relatively to each other, said stitching mechanism being provided with means which sew simultaneously at least two parallel lines of stitches through said flat base material and the two parts of each of two folded edges of a piping patch which has been placed on said flat base material over the location of the piped hole to be formed, a cutter piercing said flat base material and patch and thereby forming registering slits therein, said slits being located between and parallel to and at least partially coextensive with said lines of stitches and operating mechanism for said stitching mechanism and cutter actuating said parts in predetermined timed relation with respect to each other during the operative cycle of the machine.

22. A machine for forming piped holes in flat base material comprising stitching mechanism and a work clamp movable relatively to each other, said stitching mechanism being provided with means which sew simultaneously at least two parallel lines of stitches through said flat base material and the two parts of each of two folded edges of a piping patch which has been placed on said flat base material over the location of the piped hole to be formed, a cutter piercing said flat material and patch and thereby forming registering slits therein between and parallel to and at least partly coextensive with said lines of stitches, said cutter being progressively actuated during at least a part of the operation of the stitching mechanism and thereby cutting said slits to a length which may be different from the length of said rows of stitches and operating mechanism for said stitching mechanism and cutter actuating said parts in predetermined timed relation with respect to each other during the operative cycle of the machine.

23. A machine for forming piped holes in flat base material comprising in combination stitching mechanism and a work clamp movable relatively to each other, means which support the flat base material and a piping patch on the base material at the location of the piped hole to be formed, a folder which moves free edges of the patch toward the center of the patch forming two folded edges on said patch each of said folded edges being parallel to the piped hole to be formed, said stitching mechanism being provided with means which sew simultaneously at least two lines of stitches through said material and the said folded edges of the patch, said lines of stitches being parallel with and adjacent the piped hole to be formed, and operating mechanism actuating said parts in predetermined timed relation with respect to each other during the operative cycle of the machine.

24. A machine for forming piped holes in base material comprising a work clamp to hold the base material, a center blade movable relative to said base material which presses a part of a piping patch against the base material, a folder which moves free edges of the piping patch over said center blade, stitching mechanism for sewing two lines of stitches through the folded piping patch and the base material, a cutter progressively actuated by said stitching mechanism during a part of its operation for cutting registering slits in said patch and material between and parallel to said lines of stitches and at least partially coextensive with said lines of stitches, and a patch turner movable through said slits to bring the patch and part of said material through said slits to the side of the base material opposite to that on which the patch was originally located.

25. A machine for forming piped holes in a flat base material and a patch having registering slits therein, said machine having in combination stitching mechanism which sews the patch to the said flat base material adjacent the slits, turning means moving through said registering slits and carrying the patch back through the slits in the base material to the opposite face of the base material and operating mechanism for said stitching mechanism and turning means moving said turning means back and forth through the slit in the base material and actuating said parts in predetermined timed relation with respect to each other during the operative cycle of the machine.

26. A machine for forming piped holes in a flat base material and a patch having registering slits therein, said machine having in combination a cutter piercing said flat base material and patch and thereby forming registering slits therein, turning means moving through said registering slits and carrying the patch back through the slit in the base material to the opposite face of the base material and operating mechanism moving said turning means back and forth through the slit in the base material and actuating said parts in predetermined timed relation with respect to each other during the operative cycle of the machine.

27. A machine for forming piped holes in flat base material, said machine having in combination a cutter piercing said flat base material and thereby forming a slit therein, turning means moving through said slit and carrying a piping patch which has been secured to one face of said flat base material back through the slit in the base material to the opposite face of the base material and operating mechanism for said cutter and turning means moving said turning means back and forth through the slit in the base material and actuating said parts in predetermined timed relation with respect to each other during the operative cycle of the machine.

28. A machine for forming piped holes in a flat base material and a piping patch which has been secured to one face of the flat base material, said machine having in combination a cutter piercing said material and patch and thereby forming registering straight slits therein, additional cutting means for cutting tab slits at the ends of the straight slits, turning means moving through said registering straight slits and carrying the patch back through the slit in the base material to the opposite face of the base material and operating mechanism for said cutter additional cutting means and turning means moving said turning means back and forth through the slits in the base material and actuating said parts in predetermined timed relation with respect to each other during the operative cycle of the machine.

29. A machine for forming piped holes in base material comprising a center blade which presses a part of a piping patch against the base material movable relative to said material, a folder movable relative to said center blade, which moves free edges of the piping patch toward the center of the patch, a cutter progressively actuated for cutting registering slits in said patch and material between and parallel to said edges and a patch turner movable through said slits to bring the patch through said slits to the side of the base material opposite to that on which the patch was originally located.

30. A machine for forming piped holes in base material comprising a center blade which presses part of a piping patch against the base material movable relative to said material, a folder movable relative to said center blade which moves free edges of the piping patch toward the center of the patch, a cutter progressively actuated for cutting registering straight slits in said patch and material between and parallel to said edges and patch turners having cooperating tab cutters movable through said slits to cut slits at an angle to the straight slits which connect with them at their ends and to bring the patch through said slits to the side of the base material opposite to that on which the patch was originally located.

31. A machine for forming piped holes in base material comprising a work clamp to hold the base material, a center blade movable relative to said work clamp which presses a part of a piping patch against the base material, a folder movable relative to said center blade which moves free edges of the piping patch toward the center of the patch and a cutter progressively actuated to cut registering slits in the base material and patch between and parallel to said edges and patch turners movable through said slits to bring the patch through said slits to the side of the base material opposite to that on which the patch was originally located.

32. A machine for forming piped holes in a flat base material and a patch having registering slits therein, said machine having in combination a work clamp which holds the flat base material, turning means moving through said registering slits and carrying the patch back through the slits in the base material to the opposite face of the base material, and operating means for said work clamp and turning means moving said turning means back and forth through the slit in the base material and actuating the parts in predetermined timed relation with respect to each other during the operative cycle of the machine.

33. A machine for forming piped holes in a flat base material and a patch having registering slits therein, said machine having in combination a center blade which presses and holds a longitudinally substantially central portion of the patch against the flat base material, a folder which moves free edges of the patch over the edges of the center blade toward the center of the patch, turning means moving through said registering slits and carrying the patch back through the slit in the base material to the opposite face of the base material and operating mechanism for said center blade, folder and turning means moving said turning means back and forth through the slit in the base material and actuating said parts in predetermined timed relation with respect to each other during the operative cycle of the machine.

34. A machine for use in forming piped holes in flat base material upon which a patch has been positioned over the location of the piped hole to be formed, said machine including means supporting said base material and patch comprising in combination a cutter piercing said material and patch and thereby forming registering slits therein, operating mechanism for said cutter reciprocating it up and down and moving it progressively relative to the base material and patch and starting it and stopping it at predetermined points to cut said slits in a predetermined length and position with respect to the material and patch.

35. A machine for use in forming piped holes in flat base material and a patch having registering slits therein, said machine including means supporting said flat base material and patch comprising in combination a tab cutter to cut slits at an angle to the said registering slits in the flat base material and patch which connect with said registering slits at their ends and operating mechanism for said tab cutter actuating it once during the operative cycle of the machine and causing it to pass through said material and patch near the ends of the said registering slits and to move with respect to the base material and patch to cut said angularly disposed slit as it first passes through the material and patch to be withdrawn thereafter without cutting.

36. A machine for forming piped holes in a base material and a patch having registering slits therein, said machine having in combination means which support said base material and patch, turning means moving through said registering slits and carrying the patch back through the slit in the base material to the opposite face of the base material and operating means moving said turning means back and forth through the slit in the base material.

37. A machine for use in forming piped holes in a flat base material upon one face of which a piping patch has been positioned over the location of the piped hole to be formed, said machine including means which support said flat material and patch comprising in combination a cutter piercing said material and patch and thereby forming registering straight slits therein, a tab cutter which cuts slits at an angle to the said registering straight slits in the base material and patch which connect with said straight slits at their ends and operating mechanism for said cutter and tab cutter actuating said parts in predetermined timed relation with respect to each other during the operative cycle of the machine.

38. A machine for forming piped holes in a flat base material and a patch which has been positioned on one face of said flat base material over the location of a piped hole to be formed, said machine including means to support said flat base material and patch comprising in combination a cutter piercing said material and patch and thereby forming registering slits therein, turning means moving through said registering slits and carrying the patch back through the slit in the base material to the opposite face of the base material and operating mechanism for said cutter and patch turner, reciprocating said cutter up and down and moving it progressively relative to the base material and patch and starting it and stopping it at predetermined points to cut said slits in a predetermined length and position with respect to the material and patch, and moving said turning means back and forth through the slit in the base material and actuating said parts in predetermined timed relation with respect to each other during the operative cycle of the machine, 39. A machine for forming piped holes in flat base material comprising stitching mechanism and a work clamp movable relatively to each other, means supporting the flat base material and a patch located over the piped hole to be formed, a holder which holds the patch against the base material during part of the formation of the piped buttonhole, a folder which moves a portion of the patch inwardly toward the center of the patch and thereby forms a fold over said holder, said stitching mechanism being adapted to sew a row of stitches in the fold so formed in the patch and the base material thereby securing the patch to the base material and operating mechanism for said holder, folder and stitching mechanism actuating said parts in predetermined timed relation with respect to each other during the operative cycle of the machine.

40. In a sewing machine comprising stitching mechanism and a work clamp movable relatively to each other to sew a row of stitches in material in said work clamp, a slit cutter, actuating means for the slit cutter moving said cutter to cut a slit as the stitching progresses and means actuated in predetermined relation to a change in relative position in the needle and the work clamp causing the cutter to cut a slit which may be different in length from the length of the row of stitches put in the work by the stitching mechanism.

41. The method of forming piped holes in base material comprising the steps of positioning a piping patch on said material, folding two edges of the patch toward the location of the hole to be formed, simultaneously sewing both folded edges of the patch to the material, simultaneously therewith progressively cutting straight registering slits in said patch and the base material between said folded edges for part of the length of said patch, cutting diverging tab slits in said patch and material at the ends of said straight slits and bringing said patch and part of said material through the said slits to the side of the base material opposite to that on which the patch was originally located.

42. The method of forming piped holes in base material comprising the steps as set forth in claim 41 and the additional step of pressing the patch and the part of the material turned through the slits against the said material.

43. The method of forming piped holes in base material comprising the steps of positioning a piping patch on said material, folding two edges of the patch toward the location of the hole to be formed, simultaneously sewing both folded edges of the patch to the material, simultaneously therewith progressively cutting straight registering slits in said patch and base material between said folded edges for part of the length of said patch, cutting diverging tab slits in said patch and material at the ends of said straight slits, bringing said patch through the said slits to the side of the base material opposite to that on which the patch was originally located and folding portions of the patch and base material outwardly from the buttonhole to a position parallel with the face of the base material.

44. The method of forming piped holes in base material comprising the steps as set forth in claim 43 and the additional step of pressing the patch and the part of the material turned through the slits against the said material.

45. The method of forming piped holes in base material comprising the steps of positioning a piping patch on said material, folding two edges of the patch toward the location of the hole to be formed, simultaneously sewing both folded edges of the patch to the material, simultaneously therewith progressively cutting straight registering slits in said patch and the base material between said folded edges for part of the length of said patch and bringing a substantial portion of said patch and part of said material through the hole formed by said slits to the side of the base material opposite to that on which the patch was originally located.

LEONARD R. BRADFORD.
WILLIAM W. DUNNELL, Jr.
FRANCIS J. McAVINNEY.

REFERENCES CITED

The following references are of record in the file of this patent:

UNITED STATES PATENTS

| Number | Name | Date |
| --- | --- | --- |
| 2,282,200 | Neuman | May 5, 1942 |